United States Patent
Nissen et al.

(10) Patent No.: US 12,207,157 B2
(45) Date of Patent: *Jan. 21, 2025

(54) SYSTEM AND METHOD FOR PROVIDING CONTENT

(71) Applicant: Gotham Studios, Inc., Arlington, VA (US)

(72) Inventors: Peter Neal Nissen, Arlington, VA (US); Arriènne Monique Lezak, Arlington, VA (US); Russell Johnson, Kenmore, WA (US); Charles Dudley, Austin, TX (US)

(73) Assignee: Gotham Studios, Inc., Arlington, VA (US)

(*) Notice: Subject to any disclaimer, the term of this patent is extended or adjusted under 35 U.S.C. 154(b) by 283 days.

This patent is subject to a terminal disclaimer.

(21) Appl. No.: 16/886,585

(22) Filed: May 28, 2020

(65) Prior Publication Data

US 2020/0382911 A1    Dec. 3, 2020

Related U.S. Application Data

(60) Provisional application No. 62/853,315, filed on May 28, 2019.

(51) Int. Cl.
*H04W 4/029* (2018.01)
*G01C 21/32* (2006.01)
(Continued)

(52) U.S. Cl.
CPC ............ *H04W 4/029* (2018.02); *G01C 21/32* (2013.01); *G01C 21/367* (2013.01); *G06F 16/29* (2019.01)

(58) Field of Classification Search
CPC ...... H04W 4/029; G01C 21/32; G01C 21/367; G06F 16/29; G06F 16/4387;
(Continued)

(56) References Cited

U.S. PATENT DOCUMENTS 6,266,614 B1    7/2001   Alumbaugh
6,282,489 B1    8/2001   Bellesfield et al.
(Continued)

FOREIGN PATENT DOCUMENTS

WO    WO202043357 A1   12/2020
WO    WO2020243357 A1  12/2020

OTHER PUBLICATIONS

PCT/US2020/034989, filed May 28, 2020, International Search Report, dated Aug. 9, 2020, 2 pages.
(Continued)

*Primary Examiner* — Marcos Batista
(74) *Attorney, Agent, or Firm* — POLSINELLI LLP

(57) ABSTRACT

Servers and methods for determining geo-relevant interactive assets are provided. A server and method can be configured to determine a starting location, a direction, and a speed of travel. The server can then calculate future location information, and use the future location information to filter one or more geo-relevant interactive assets. Filtered geo-relevant interactive assets can be added to a map, and current location information can be determined. Geo-relevant interactive assets can be played or displayed according to the current location information.

21 Claims, 30 Drawing Sheets

(51) Int. Cl.
*G01C 21/36* (2006.01)
*G06F 16/29* (2019.01)

(58) Field of Classification Search
CPC .............. G06F 16/487; G06F 16/9537; H04N 21/23109; H04N 21/25841; H04N 21/26241; H04N 21/2668; H04N 21/41422
USPC ....................... 701/533; 455/436–437, 456.2
See application file for complete search history.

(56) References Cited

U.S. PATENT DOCUMENTS

| | | | |
|---|---|---|---|
| 6,446,002 B1 | 9/2002 | Barton | |
| 6,526,411 B1 | 2/2003 | Ward | |
| 6,650,288 B1 | 11/2003 | Pitt et al. | |
| 9,031,939 B2 * | 5/2015 | Nissen | G06F 16/245 701/431 |
| 9,355,154 B2 | 5/2016 | Nissen | |
| 9,830,322 B2 | 11/2017 | Nissen | |
| 9,858,276 B2 | 1/2018 | Nissen | |
| 10,180,941 B2 | 1/2019 | Nissen | |
| 10,831,813 B2 | 11/2020 | Nissen | |
| 11,100,155 B2 | 8/2021 | Nissen | |
| 2005/0192025 A1 | 9/2005 | Kaplan | |
| 2007/0174881 A1 | 7/2007 | Idehara et al. | |
| 2007/0219708 A1 | 9/2007 | Brasche et al. | |
| 2008/0010014 A1 | 1/2008 | Hess et al. | |
| 2009/0044246 A1 | 2/2009 | Sheehan et al. | |
| 2009/0048908 A1 | 2/2009 | Kaplan et al. | |
| 2012/0221687 A1 * | 8/2012 | Hunter | G06F 16/435 709/219 |
| 2014/0028971 A1 | 9/2014 | Isbell, III et al. | |
| 2014/0281971 A1 | 9/2014 | Isbell, III et al. | |

OTHER PUBLICATIONS

Notice of Allowance, dated Sep. 10, 2018, for U.S. Appl. No. 15/797,503.
First Action Interview Pilot Program, Pre-Interview Communication, dated Jun. 7, 2018, for U.S. Appl. No. 15/797,503.
Final Office Action, dated Oct. 23, 2012, for U.S. Appl. No. 12/286,859.
Non-Final Office Action, dated Jun. 24, 2014, for U.S. Appl. No. 12/286,859.
Non-Final Office Action, dated Feb. 3, 2012, for U.S. Appl. No. 12/286,859.
Non-Final Office Action, dated Jul. 12, 2011, for U.S. Appl. No. 12/286,859.
Notice of Allowance, dated Jan. 9, 2015, for U.S. Appl. No. 12/286,859.
Notice of Allowance, dated Jan. 29, 2016, for U.S. Appl. No. 14/676,689.
Non-Final Office Action, dated Feb. 7, 2017, for U.S. Appl. No. 15/143,232.
Notice of Allowance, dated Aug. 30, 2017, for U.S. Appl. No. 15/143,232.
First Action Interview Pilot Program, Pre-Interview Communication, dated Apr. 20, 2017, for U.S. Appl. No. 15/291,644.
Notice of Allowance, dated Jul. 28, 2017, for U.S. Appl. No. 15/291,644.
Notice of Allowance, dated Jul. 9, 2020, for U.S. Appl. No. 15/823,428.
First Action Interview Pilot Program—Pre-Interview Communication, dated Apr. 3, 2020, for U.S. Appl. No. 15/823,428.
Final Office Action, dated Oct. 23, 2012, for U.S. Appl. No. 12/286,859, 14 pages.
Non-Final Office Action, dated Jun. 24, 2014, for U.S. Appl. No. 12/286,859, 11 pages.
Non-Final Office Action, dated Feb. 3, 2012, for U.S. Appl. No. 12/286,859, 12 pages.
Notice of Allowance, dated Jan. 9, 2015, for U.S. Appl. No. 12/286,859, 6 pages.
Notice of Allowance, dated Jan. 29, 2016, for U.S. Appl. No. 14/676,689, 9 pages.
PCT/US2020/034989, May 28, 2020, ISR and Written Opinion, dated Aug. 6, 2020, 8 pages.
First Action Interview Pilot Program Pre-Interview Communication, dated Jan. 6, 2021, for U.S. Appl. No. 16/208,164.
Notice of Allowance, dated Apr. 19, 2021, for U.S. Appl. No. 16/208,164.

* cited by examiner

OVERVIEW

MODULE I:
Filter to Eligible Locations

MODULE IV
Optimization
(overview)

MODULE IV
Submodule: Simultaneous Areas

MODULE IV
Submodule: Area-Point lockups

FIG. 8
Illustration of Play-windows
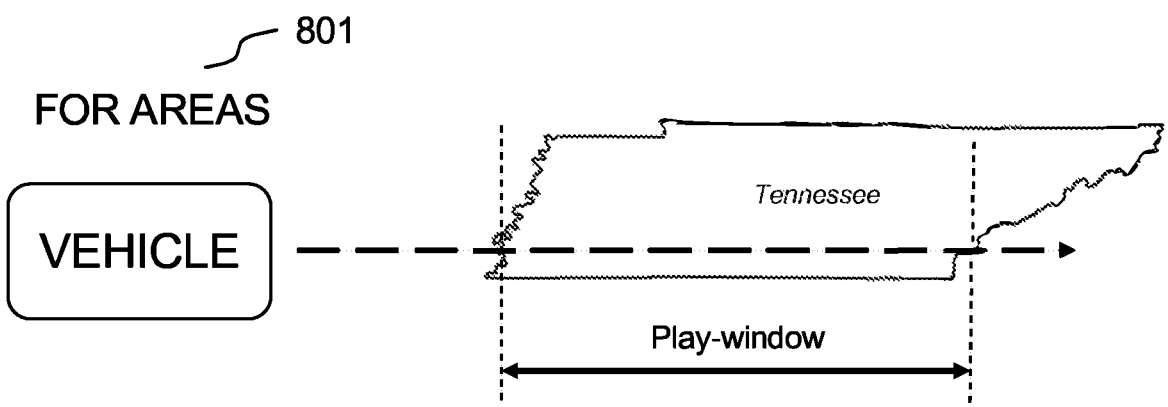
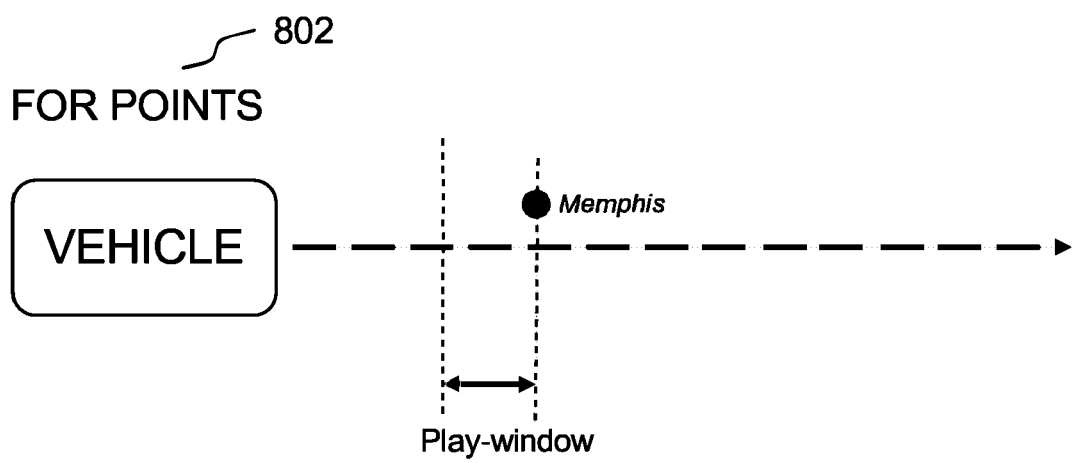

Scoring eligible locations near a travel path

903

SCORING FACTORS:

Distance from path: Can favor closer ones.

Length of asset: length of associated audio/video in seconds

Shift tolerance: how easily can we move it forward/backwards? Tolerance can increase with distance from path FIG. 11
Example Aircraft Data

- Airspeed / Mach
- Altitude
- City Pair
- Departure City
- Destination City
- Distance to Destination
- Estimated Time of Arrival
- GMT/UTC Date
- GMT/UTC Time
- Ground Speed
- Heading
- Headwind / Tailwind
- Indicated Airspeed
- Latitude
- List of Waypoints
- Local Time at Destination
- Local Time at Origin
- Local Time at Present Position
- Longitude
- Mach Number
- Outside Air Temperature
- Pitch
- Roll
- Time Since Departure
- Time to Destination
- Track Angle/Heading
- True Airspeed GojiView Dimensions Diagram FIG. 12D
GojiView Example Dimensions

|  | MAXIMUM | | |
|---|---|---|---|
|  | 18" | 24" | 27" |
| HEIGHT | 11.0 inches | 13.5 inches | 25.0 inches |
| WIDTH | 18.0 inches | 22.0 inches | 15.0 inches |
| DEPTH | 1.25 inches | 1.4 inches | 1.5 inches |

FIG. 12E
GojiView Example Weight

|  | MAXIMUM | | |
|---|---|---|---|
|  | 18" | 24" | 27" |
| WEIGHT | 6.6 Lbs. | 10 Lbs. | 18 Lbs. |

FIG. 12F
GojiView Example Connectors

| Label | Function | Connector type | Brand/model |
|---|---|---|---|
| J1 | POWER, ARINC 429, Discrete Inputs, and Audio | Locking D-sub | TE Connectivity 5746953-1 |
| J2 | 1Gbps Ethernet | Locking RJ45 | Amphenol MRJR-5384-01 |
| J3 | USB | Locking USB Type A | Amphenol LUSB-3193-00 |
| J4 | HD-SDI | Micro BNC | TBD |
| J5 | HDMI | Locking HDMI | Amphenol MHDR-A111-20 |

GojiView Block Diagram

ARCHITECTURE - SYSTEM

ARCHITECTURE - SERVER

CUSTOMER CONTROL

MARKETING WEBSITE

SYSTEM AND METHOD FOR PROVIDING CONTENT

CROSS-REFERENCES TO RELATED APPLICATIONS

This application claims priority to U.S. Provisional Application No. 62/853,315, filed on May 28, 2019, which is incorporated herein by reference in its entirety.

This application is also related to the following:

U.S. patent application Ser. No. 16/208,164, filed Dec. 3, 2018, entitled GEORADIO;

U.S. patent application Ser. No. 15/283,428, filed Nov. 27, 2018, entitled METHOD TO PROVIDE LOCATION-RELEVANT ENTERTAINMENT;

U.S. patent application Ser. No. 15/797,503, filed Oct. 30, 2017, now U.S. Pat. No. 10,180,941, issued Jan. 15, 2019, entitled GEORADIO;

U.S. patent application Ser. No. 15/291,644, filed Oct. 12, 2016, now U.S. Pat. No. 9,830,322, issued Nov. 28, 2017 entitled GEORADIO;

U.S. application Ser. No. 15/143,232, filed Apr. 29, 2016, now U.S. Pat. No. 9,858,276, issued Jan. 2, 2018, entitled MEDIA SEQUENCING METHOD TO PROVIDE LOCATION-RELEVANT ENTERTAINMENT;

U.S. application Ser. No. 14/676,689, filed Apr. 1, 2015, which is now U.S. Pat. No. 9,355,154, issued May 31, 2016, entitled MEDIA SEQUENCING METHOD TO PROVIDE LOCATION-RELEVANT ENTERTAINMENT; and U.S. application Ser. No. 12/286,859, filed Oct. 2, 2008, which is now U.S. Pat. No. 9,031,939, issued May 12, 2015, entitled MEDIA SEQUENCING METHOD TO PROVIDE LOCATION-RELEVANT ENTERTAINMENT, the contents of which are hereby incorporated by reference in their entirety.

TECHNICAL FIELD

The present disclosure relates generally to computer-implemented servers and methods for providing content.

BACKGROUND

Current servers and methods to provide content, such as an in-flight entertainment server, can be heavy and expensive. Additionally, the content provided on current servers is not closely related to the travel location or destination. Systems and methods are needed to provide for entertainment systems that are lighter, less expensive, and that provide entertainment more closely related to travel locations and destinations.

SUMMARY

This application has been drafted in three parts. In Part One ("Methods"), example methods for determining, ordering, and presenting geo-relevant content are provided. In Part Two ("Hardware"), example devices and systems for execution of the example methods and presentation of example content are provided. In Part Three ("Architecture"), example applications that control the example devices and example system administration and user experience are provided.

For definition, as used here, "vehicle" refers to something that can transport people. Examples of "vehicles" can include, but are not exclusive to, cars, buses, trains, boats, monorails, airplanes and helicopters.

In accordance with the teachings provided herein, methods, and servers for determining geo-relevant interactive assets are provided. A method and server can be configured to determine a starting location, a direction, and a speed of travel. The method can then calculate future location information, and use the future location information to filter one or more geo-relevant interactive assets. Filtered geo-relevant interactive assets can be added to a map, and current location information can be determined. Geo-relevant interactive assets can be played or displayed according to the current location information.

In some embodiments, geo-relevant interactive assets include interactive location information that can facilitate planning associated with the location.

In some embodiments, geo-relevant interactive assets can be played or displayed according to an order or randomly.

In some embodiments, when an interactive asset is no longer geo-relevant, the interactive asset can be removed and replaced with a different geo-relevant interactive asset.

Particular embodiments of the subject matter described in this specification can be implemented to realize one or more of the following advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 8 shows an example method for determining a play-window of an area.

FIG. 11 shows example aircraft data.

FIG. 12D shows a chart of example dimensions for example monitors for displaying geo-triggered assets.

FIG. 12E shows a chart of example weights for example monitors for displaying geo-triggered assets.

FIG. 12F shows a chart of example connectors for an example monitor for displaying geo-triggered assets.

Like reference numbers and designations in the various drawings indicate like elements.

DETAILED DESCRIPTION

Part One: Methods

Figure 1:
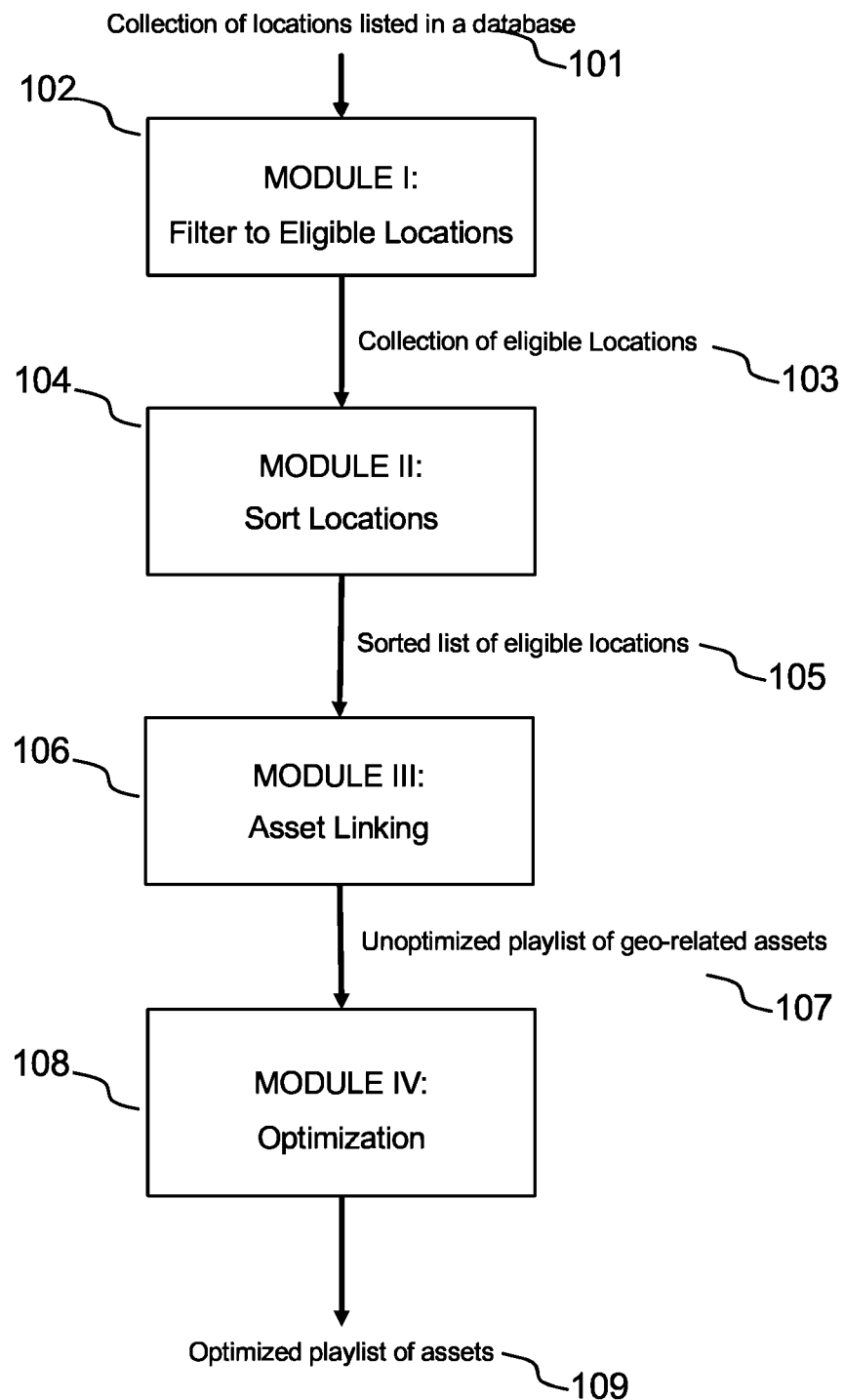
FIG. 1 shows an overview diagram of an example method for filtering locations and geo-related assets into an optimized playlist of assets.

When a person moves through space, or virtually navigates through a virtual space, media assets and information can be presented to the person, visually or aurally, that are relevant to fixed locations or areas within that space. Examples of these assets can be but are not limited to photographs, text messages, visual advertisements, spoken driving directions, spoken narrations, songs, videos, audio and multimedia.

Determining the timing of these assets is a challenge, such as when they are presented, and when they are withdrawn from presentation. An asset may have a "play-duration" (if it is an audio file), or no inherent duration (if it is a photograph). In some implementations, a location may be defined as "point-shaped" (e.g., a building, or if the observer is far above the ground in an airplane, a city), or better suited to be defined as "area-shaped" (e.g., a state). In these implementations, the timing can be affected by the speed (e.g., of the person), through the space or virtual space.

Methods are described herein for automatically creating a playlist of geo-relevant geo-triggered assets, given a motion through an area into which one or more assets have been assigned and geo-tagged. In some implementations, "optimal" timing (e.g., maximum usefulness, informativeness, or entertainment value to the user), can be a priority. For example, each asset can be presented at an appropriate, geo-relevant time, and can be presented for an appropriate duration in relation to the geo-relevant time. In some implementations, balancing the priorities between location information can be necessary (e.g., balancing priorities between "point-shaped" location information and "area-shaped" location information).

Existing methods can facilitate the presentation of assets upon proximity to a point (e.g., when a driver comes close to a highway exit, a spoken driving direction is played). Existing methods can also facilitate the presentation of one or more assets when a user passes through the border of an area (e.g., hearing "welcome to Tennessee"), a method commonly referred to as "geo-fencing." Presently no method exists for combining the two or more types of location information into a single calculation for facilitating optimal timing for the generation and presentation of geo-relevant assets.

For purposes of this detailed description, an asset (e.g., a media asset) can be anything presented to an observer in visual and/or aural/audio form, (e.g., a photograph, a video, a song, a narration, text, presented alone or in combination with one or more other forms). A media asset may have an inherent length of presentation (e.g., a video, a song, or a narration), or may have an undefined length (e.g., display of an image or text).

A playlist can be a list of one or more assets, which can include one or more visual assets, one or more aural/audio assets, or a combination or one or more visual and aural/audio assets. A playlist can include an order of intended presentation (e.g., to an observer). A play-window can define a time during which it is appropriate for an asset to be presented.

An "anchor" time can be associated with a location and can be a calculated time when the presentation of an asset optimally either begins or ends. An "anchor" time can provide a way to sort one or more assets that are related to one or more locations. However, "anchor" times can differ depending on whether the location is an area or a point. For areas, the "anchor" time can be the start of the play-window, meaning the time at which a user or object movement is projected to cross the first border of an area in question (e.g., the "anchor" time associated with the state of Illinois can be the moment when the vehicle crosses the border into Illinois). For points, the "anchor" time can be at the end of a play-window, which can coincide, for example, with the closest approach to a point (e.g., the "anchor" time associated with the city of Chicago can be the moment when the vehicle is closest to the latitude and longitude of Chicago).

FIG. 1 shows an overview diagram of an example method that can perform certain functionalities for filtering locations and geo-related assets into a final playlist of assets. In some implementations, the example method can consist of one or more modules. In these implementations, example models can include: MODULE I: For filtering a collection of locations into a collection of eligible locations [102], MODULE II: For sorting locations [104], MODULE III: For linking assets [106], and MODULE IV: For optimizing an asset playlist [108].

In these implementations, Module I [102] can receive a collection of one or more locations listed in a database [101], and by using various methods, reduce the collection to only the locations that satisfy certain criteria such as, for example, geography, thereby filtering the collection to a smaller collection of "eligible" locations [103]. In these implementations, Module II [104] can receive a collection of one or more "eligible" locations [103], and by using various methods, and criteria such as, for example, location, speed and direction of the user, and geographical aspects of the location, determine in which order the locations can be optimally presented to the user, resulting in a sorted list of eligible locations [105]. In these implementations, Module III [106] can receive a sorted list of eligible locations [105], and by using various methods, cross-reference the locations with assets listed in a database, creating an unoptimized playlist of geo-related assets [107]. In these implementations, Module IV [108] can receive an unoptimized playlist of geo-related assets [107], and by using various methods, for example by swapping out audio assets with other assets with more optimal length, and/or by solving problems of simultaneous areas, and/or by solving problems of area-point lockups, can create an optimized playlist of assets. The result of these one or more processes can include a final (e.g., a current dynamic featured) playlist of assets [109].

Figure 2:
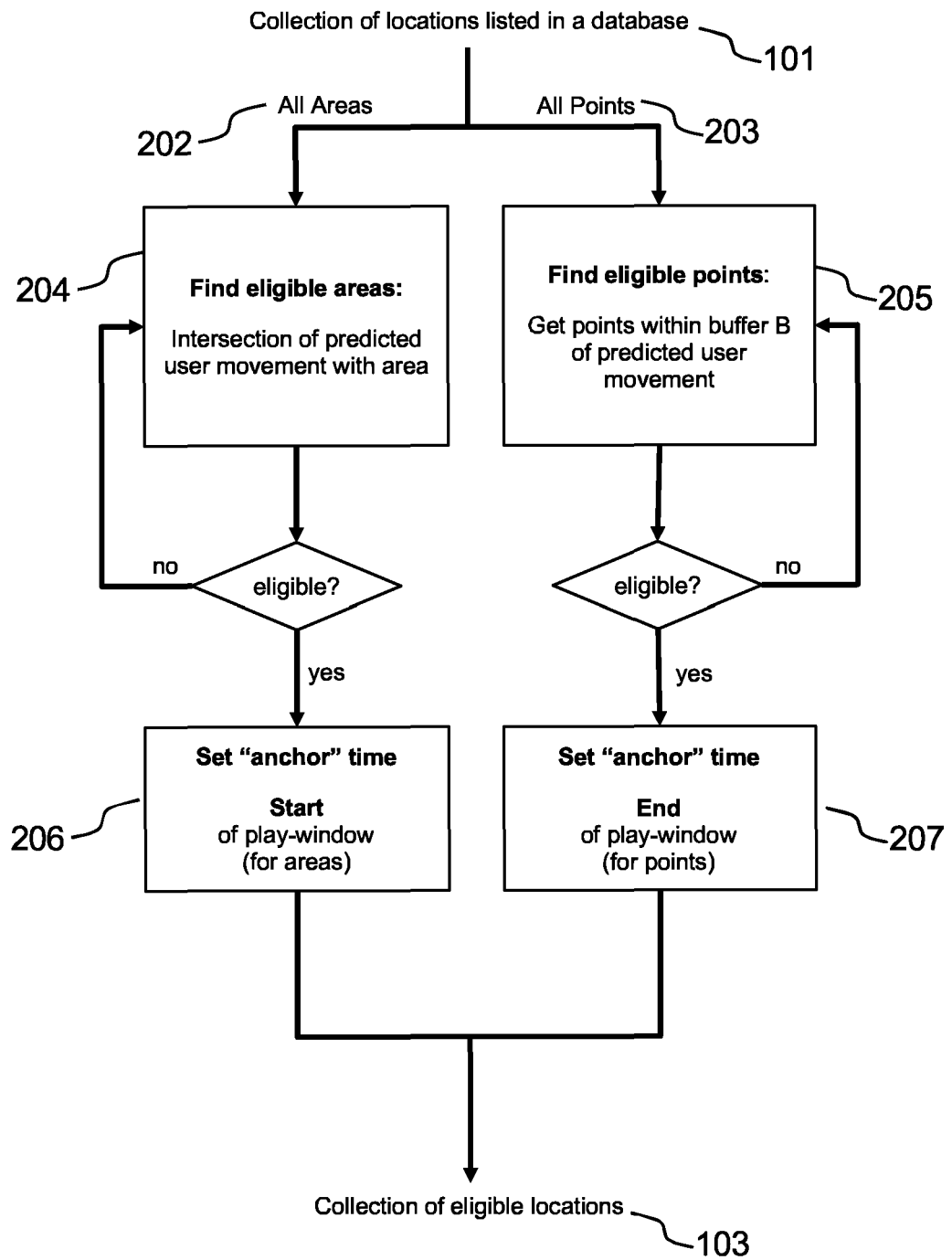
FIG. 2 shows a diagram of an example method for filtering locations into a collection of eligible locations.

FIG. 2 shows a diagram of an example Module I [102], which is an example method that can perform certain functionalities for filtering locations into a collection of eligible locations. In some implementations, a collection of one or more locations listed in a database [101] are used as input. In some implementations, a group of one or more locations can be split into a group of one or more areas [202] and/or a group of one or more points [203]. For example, this method can be used to find one or more eligible areas [204]. In some implementations, this process can be accomplished, for example, by testing whether the projected movement of a user or an object (e.g., within a flight path, or along a highway) intersects one or more areas, and if the user or object intersects one or more areas, that or those areas are eligible. Additionally, a method can be used to determine one or more eligible points [205]. In some implementations, this process can be accomplished, for example, by testing whether the projected movement of a user or object intersects a buffer zone of a specified distance from a point.

In some implementations, "anchor" times are set for one or more eligible locations. An "anchor" time associated with a location can be a calculated time when an asset associated with the location can optimally either be presented or cease to be presented. In these implementations, an "anchor" time can provide a way to sort locations. However, as summarized above, "anchor" times can differ depending on whether a location is an area or a point.

In some implementations, a start "anchor" time [206] can be the start of a play-window (e.g., the time at which the movement of a user or an object is projected to cross a first border of an area in question). This start anchor time [206] can be essential (e.g., for purposes of usefulness, informativeness, and entertainment value), because it can represent an entry into a new area, which can be a narratively interesting moment. Upon crossing the border into Tennessee, for example, this calculation may trigger an audio asset to play an asset wherein a narrator says, "Welcome to Tennessee." If such an announcement is delayed substantially, it can become less relevant and less accurate.

By contrast, an end "anchor" time [207] corresponding to a point can be at the very end of a play-window, which, as explained above, can coincide with the closest approach to the point. This can be optimal because it can facilitate the presentation of one or more media assets to be "back-timed" to that moment of closest approach. For example, if an audio narration about the city of Memphis lasts two minutes, the server can "back-time" or trigger the audio to play two minutes before closest approach to the city. The audio asset can start by saying "we are approaching" followed by the name of the city, and end by inviting the observer to see the city if it is visible. This is a narrative technique of storytelling, which includes an introduction about a subject, and a rewarding "payoff" at the end.

In some implementations, a method can be used to order the presentation of one or more geo-relevant assets (e.g., when an observer is as close as possible to one or more points). In these implementations, asset order can be altered, for example, when an asset should or must be presented at another time (for example, if the playlist is crowded with many available assets), and it is better to present the asset before the observer passes the point, rather than after (at which time it may be perceived as "old news," or too late for the observer to look for it). In these implementations, it can be necessary that an anchor time associated with one or more points needs to be at the end of a play-window. In some implementations, one or more sub-modules may rely on this pattern. For example, in these implementations, one or more sub-modules can shift point-assets backwards in time in the playlist, rather than forward in time.

In some implementations, at the end of this module, the collection of locations listed in a database [101] has been filtered to a collection of eligible locations [103] consisting of areas, points, or some combination of areas and points. In these implementations, the collection of eligible locations [103] can be relevant to the observer (e.g., as it relates to the predicted motion of the observer).

Figure 3:
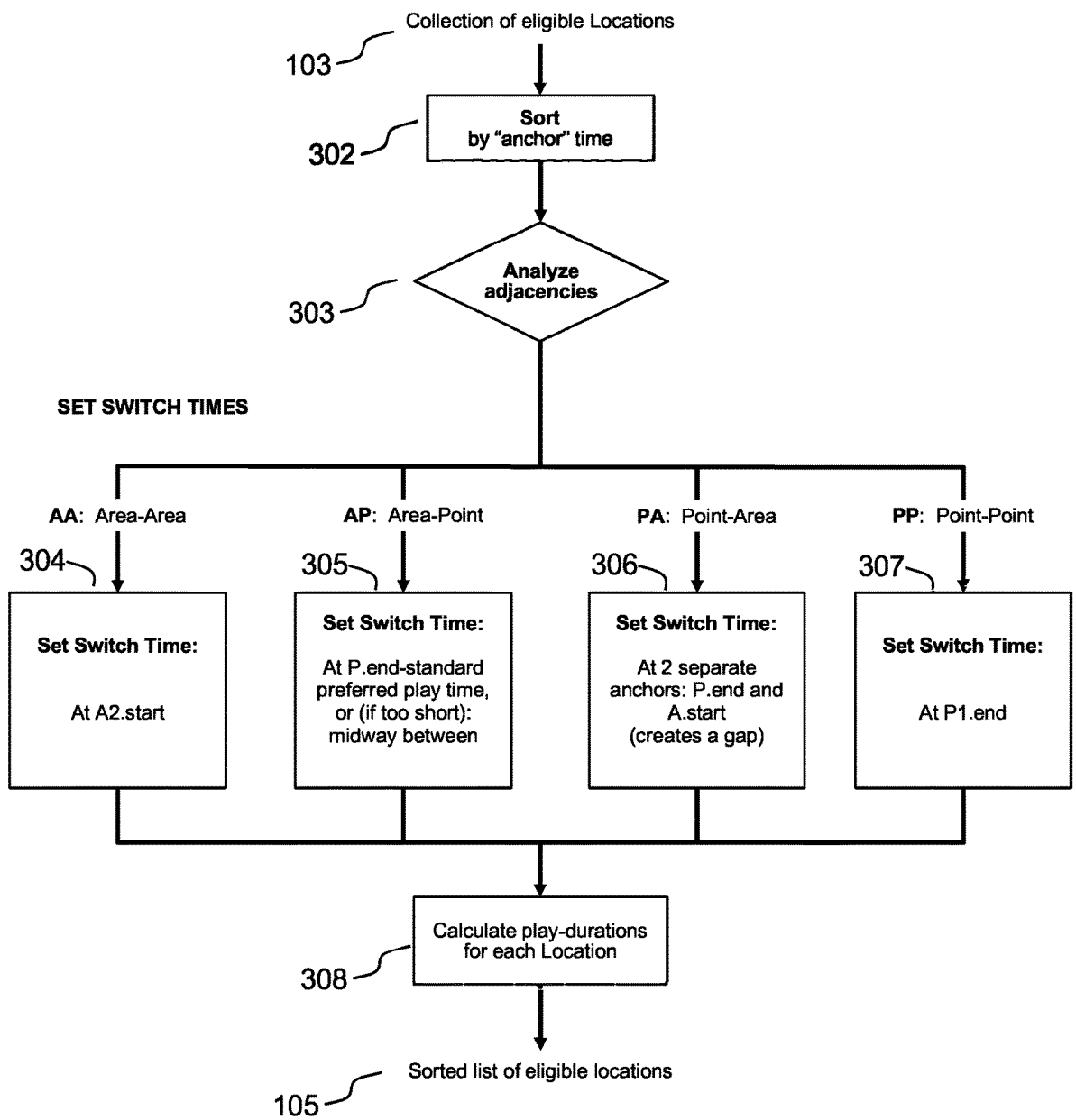
FIG. 3 shows a diagram of an example method for sorting a collection of locations into a sorted list of locations.

FIG. 3 shows a diagram of an example of Module II [104], a method that can perform certain functionalities for sorting a collection of eligible locations into a sorted list of eligible locations. In some implementations, one or more eligible locations [103] can be sorted (e.g., according to one or more anchor times) [302]. In these implementations, this sorting can generate a playlist of mixed areas and points, where area-related assets are ideally triggered upon entering the area, and point-related assets are ideally back-timed to end at the moment of closest approach to the point.

In some implementations, Module II [104] can analyze adjacencies [303] in the playlist, meaning that it compares each element of the playlist with its preceding and following element. In these implementations, Module II [104] can include up to four sub-modules [304]-[307] designed to set "switch times," meaning the time when one location's asset should end and another location's asset should begin. Each sub-module can be designed to address a different situation.

For the sake of clarification, formulas described here use the following variables to refer to locations. The variable "A" represents an "Area"-type location, and the variable "P" represents a "Point"-type location. If a formula includes two of the same type of location, a number will be included: therefore, "A1" means "Area #1" and "A2" means "Area #2." Additionally, formulas here use dot-suffixes to represent an attribute of a location. Therefore, "A1.start" means the start of the play-window of Area #1 (the earliest moment at which any associated asset can begin). Also for example, "P.end" means time at which the end of a play-window of a point-type location ends.

In one example of a submodule of Module II [104], in an Area/Area ("AA") situation (e.g., when the playlist includes an area followed by another area), the AA "switch" time [304] can be set at the second area's anchor point (which, because it is an area, occurs at the first moment of encounter with the area), designated as A2.start. For example, if an airplane is flying west over Colorado, and is calculated to encounter the Rocky Mountains at exactly 2:00 pm, A1 represents Colorado, and A2 represents the Rocky Mountains. The "switch" time will be A2.start, or 2:00 pm, the moment the airplane encounters the edge of the Rocky Mountain area.

In another example, an Area/Point ("AP") situation (e.g., when a playlist includes an area followed by point), the AP "switch" time [305] can be determined by the formula: P.end-standard preferred play time.

For definition, as used here, "standard preferred play time" means an assigned or calculated unit of time, for example 1 minute, 5 minutes or 10 minutes, representing an estimated ideal length where one audio or one video asset can play to completion.

An example of an "Area/Point" situation could be if a train is travelling east through New Jersey and is calculated to reach its closest approach to the latitude and longitude of Hoboken at exactly 3:00 pm. For the sake of the formula in this example, the variable "A" can represent New Jersey (an area) and "P" can represent Hoboken (a point). P.end is the end of the play-window for Hoboken, which, for points, can be the moment of closest approach: in this case, P.end is 3:00 pm. If the "standard preferred play time" is assigned to be 5 minutes, the "switch" time would be 3:00 pm minus 5 minutes, equaling 2:55 pm.

This results in a "back-timed" result, where the point's related asset can begin to play in advance of the closest approach to the point, by a margin that can be determined by a specified standard preferred play time. In this situation, if the anchor time of the point (P.end) minus the anchor time of the area (A.start) is less than the standard preferred play time, the switch time can be set midway between A.start and P.end.

In another example, a Point/Area ("PA") situation (e.g., when a playlist includes a point followed by an area), two PA switch times [306] can be set: P.end and A.start. This creates a gap in the playlist that can be resolved by later modules. For example, if P represents the city of Los Angeles, and A represents the Pacific Ocean, and a westward-driving car on Interstate 10 is due to pass Los Angeles at 4:00 pm and reach the ocean at 4:30 p, the two "switch" times will be 4:00 pm (the end of the play-window of Los Angeles) and 4:30 pm (the start of the play window of the ocean).

In another example, a Point/Point ("PP") situation (e.g., when a playlist includes a point followed by another point), the PP switch time [307] can be set at P1.end. This can create a short play-window for P2, which can be resolved by later modules. For example, if an airplane is flying east over Texas, and is due to fly over Fort Worth at 10:00 am, and then Dallas at 10:03 am, then P1 represents Fort Worth, P2 represents Dallas, and the switch time can be at 10:00, which is the end of the play-window for Fort Worth. Although this only gives three minutes for, for example, a possible audio story about Dallas, whose play-window expires at 10:03, this situation can be resolved by modules discussed below.

In some implementations, once all adjacencies are analyzed, the module can calculate the play-durations for each location [308] and output a sorted list of eligible locations [105].

Figure 4:
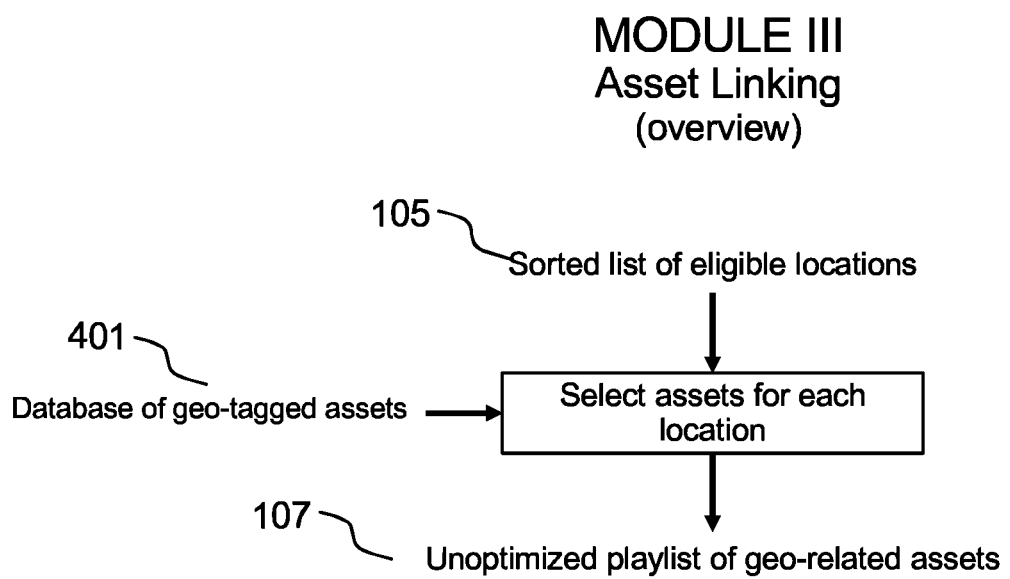
FIG. 4 shows an overview diagram of an example method for linking assets with a sorted list of eligible locations to create an unoptimized playlist of geo-related assets.

FIG. 4 shows an overview diagram of an example of Module III [106], which can link locations to assets. In some implementations, given a sorted list of eligible locations [105], this Module can perform certain functionalities to cross-reference a sorted list of eligible locations against one or more assets in a database that have been pre-geo-tagged with indications that they are related to certain locations [401]. The Module can then select and order qualifying assets into an unoptomized playlist of geo-related assets [107]. For example, in a train journey from Boston to New York, the sorted list of eligible locations might include, for example, Boston, Providence, and New Haven. Module III would select stories from a database of audio stories that might include, for example, a song from Aerosmith (geo-tagged as related to Boston), a story describing the "Water-Fire Festival" of Providence, and a review of pizza from New Haven.

In some implementations, Module III [108] can order the geo-tagged assets in the order in which they would be encountered during the current travel, i.e. in the same order as in the sorted list of eligible locations, but instead of locations, the playlist contains references to the assets associated with those locations.

Once assets have been assigned to locations, more comprehensive calculations can be done by analyzing the unoptimized playlist of geo-related assets. Since the unoptimized playlist of geo-related assets can have two kinds of information, namely location information as well as asset information such as asset length, calculations can be made as to whether an asset with a duration, such as an audio story, will, for example, have enough time to be played, considering the geographical environment.

Figure 5:
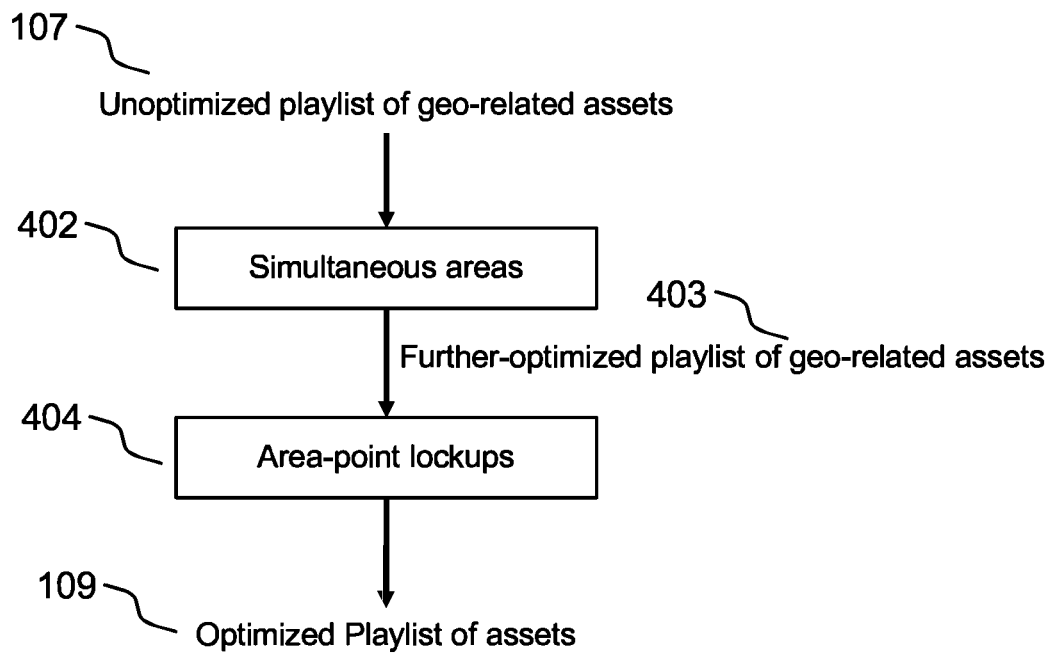
FIG. 5 shows an overview diagram of an example method for optimizing a playlist of geo-related assets into an optimized playlist of assets.

For this reason, in some implementations, Module IV [108], as illustrated in FIG. 5, can optimize a playlist by using both asset information and geographical information. In some implementations, Module IV [108] includes one or more sub-modules [402] and/or [404], and each sub-module [402] and/or [404] within Module III [108] can create one or more playlists of increasing optimization [403], in terms of maximum usefulness, informativeness, and entertainment value to the user.

In some implementations, sub-modules [402] and [404] of Module III [108] can each solve a specific problem, such as simultaneous areas (sub-module [402]) and area-point lock-ups (sub-module [404]), for example.

Figure 5A:
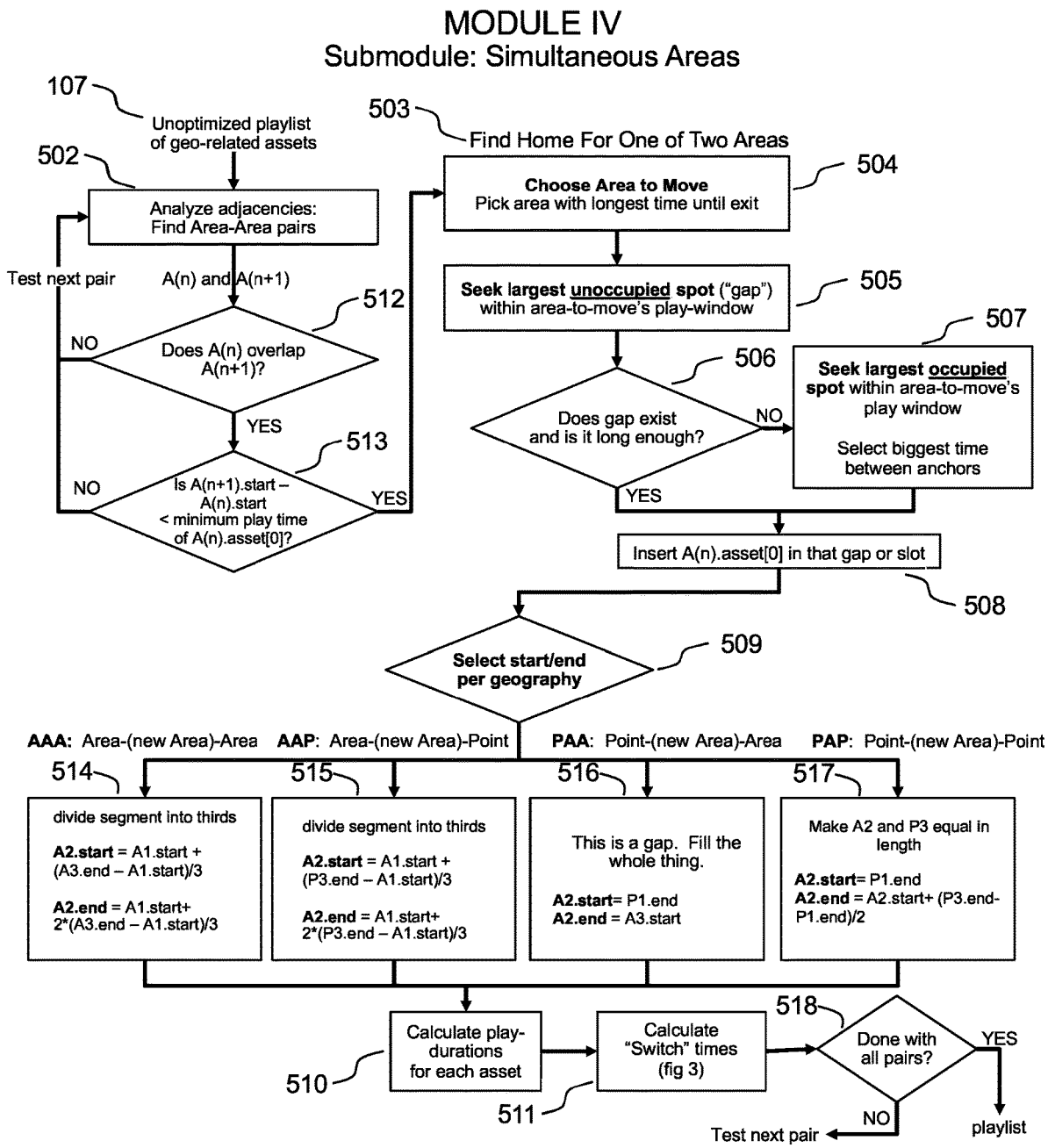
FIG. 5A shows a diagram of an example method for optimizing a playlist of locations and geo-related assets by solving problems of simultaneous areas.

As an example showing greater detail of a sub-module of Module III [108], FIG. 5A shows a diagram of an example of the simultaneous areas sub-module [402], which can perform certain functionalities for optimizing geo-related assets by solving problems of simultaneous areas.

In some implementations, an unoptimized playlist of geo-related assets [107] can be analyzed for adjacencies [502] in the asset's associated locations, to identify where one area's anchor immediately follows another area's anchor. In these implementations, where area-area pairs are found, these pairs can be tested to determine if the first area A(n) overlaps the second area A(n+1) [512]. If A(n) overlaps A(n+1), the pair can be further analyzed to determine if there is sufficient time between the two area's anchors to play the top-selected asset related to A(n), referred to here as A(n).asset[0]. "Sufficient time" can be affirmed if the difference between the two anchors is larger than the "minimum play time" of the asset [513], which may be the inherent length of the asset in the case of e.g. an audio file, or a standard preferred play-time in the case of assets without inherent length, e.g. a photograph. If A(n) does not overlap A(n+1), then the next pair can be tested. Additionally, if there is not sufficient time between the two areas anchors to play the top selected asset related to A(n), then the next pair can be tested.

In some implementations, the simultaneous areas sub-module [402] can further process any area-area pairs where there is not sufficient time to play A(n).asset[0]. In these implementations, the simultaneous areas submodule [402] can attempt to "find a home" for one of the two areas [503], by re-assigning an area to a different time. The simultaneous areas submodule [402] can choose which area to move [504] based on longest time until exit, can seek the largest unoccupied spot [505] ("gap") within the area's possible play-window, can examine that gap to determine if it is large enough to accommodate the area's asset [506], and can seek the largest occupied spot [507] if no gap is large enough to accommodate it.

In some implementations, this submodule can then insert the area's asset in the gap or slot [508] determined from these methods. In these implementations, this insertion process can start by analyzing the pattern of geographical types [509] that will be created when the area is inserted between two other points.

For example, consider an Area-(new Area)-Area ("AAA") situation, where A1 and A3 are existing areas associated with a playlist, and A2 represents a new area that needs to be inserted between them. As seen in [514], the start-time for Area A2 (referred to as A2.st) can be calculated as the moment one-third between the start time of A1 and the end of A2. The formula for this can be:

$$A2.start=A1.start+(A3.end-A1.start)/3$$

Additionally, the end-time for Area A2 (referred to as A2.end), can be set at ⅔ of the total time. In other words:

$$A2.end=A1.start+2*(A3.end-A1.start)/3$$

In practice, the formulae above can create a preliminary equality in the time granted to play assets for each area. For example, consider a plane flying west-to-east over Kansas for 30 minutes, where the playlist has only two available assets, devoting the first 15 minutes to an audio story called "Great Plains" (A1) and the last 15 minutes to an audio story called "The State of Kansas" (A3). If the module determines that a third, area-related asset needs to be inserted between these two assets, such as a story called "The Dust Bowl" (A2), the current formula will divide the total time in thirds, devoting 10 minutes to each story.

In another example, an Area/(new Area)/Point ("AAP") situation as seen in [515], A1 and P3 can represent an area and a point, between which must be inserted an area A2. The calculation in this case [515] is the same as in the previous case [514], dividing the total time in thirds. The formulae for this can be:

$$A2.start=A1.start+(P3.end-A1.start)/3$$

And:

$$A2.end=A1.start+2*(P3.end-A1.start)/3$$

An example for this might be a flight over France as it approaches Paris from the Northwest, with a 30-minute predicted travel time between the French coast and the capital city. In this example, the playlist preliminarily contains only two assets, devoting the first 15 minutes to a video called "France" (A1) and the last 15 minutes to a video called "Paris" (P3). If the module determines that an area-related asset needs to be inserted between these two assets, such as a video called "The Route of the Seine" (A2), the current formula will divide the total time in thirds, devoting 10 minutes to each story.

In another example, a Point/(new Area)/Area ("PAA") situation as seen in [516], P1 and A3 can represent a point and an area, between which must be inserted an area A2. Because optimal anchor-placement as illustrated in [206] and [207] puts point anchors at the end of their play windows, and puts area anchors at the start of their play windows, the P1-A3 situation creates a gap between P1.end and A3.start. Therefore, the solution for A2 can be simple: namely, to fill the gap with the new area. The formulae for this can be:

$$A2.start=P1.end$$

And:

$$A2.end=A3.start$$

An example for this might take place in a passenger bus, driving south through Nevada along Interstate 15, passing through Las Vegas, plus 45 more minutes between Las Vegas and the border of California. In this situation, there may be a 20-minute audio story about the history of Las Vegas. The audio story can be back-timed to end just as the bus passes the city. Then, there is a gap of 45 minutes, before the bus crosses the border and starts playing the song "Hotel California." That gap can be filled with an audio documentary about the history of mining in Nevada. The audio documentary can start playing right after the Las Vegas story and stop playing right before the California song.

In another example, a Point/(new Area)/Point ("PAP") situation as seen in [517], P1 and P3 can represent two points, between which must be inserted an area A2. The inserted area can start right when P1 ends. For its end, A2 may share the remaining time equally with P3, splitting the time in half between the end of P1 and the end of P3. The formulae for this can be:

$$A2.start=P1.end$$

And:

$$A2.end=A2.start+(P3.end-P1.end)/2$$

This may be demonstrated in the example of a cruise ship, heading north from Seattle up to Alaska. At the start of the cruise, the ship passes two towns, Port Townsend (P1) at 11 am and, an hour later at 12 noon, Victoria (P3). Between them in the playlist, the Module inserts an area, the body of water called the Haro Strait (A2). For its assets, this implementation shows photographs of each location. The Port Townsend photo is shown until the ship passes the town at 11 am. The Haro Strait photo is shown until 11:30 (halfway to Victoria), upon which the Victoria photo is shown until the closest approach to Victoria.

In some implementations, the simultaneous areas submodule [402] can then calculate play-durations for each asset [510], and calculate one or more switch times [511], using, for example, the method described in FIG. 3 above. Once the simultaneous areas submodule [402] has analyzed all pairs [518] of adjacent locations in the playlist, it can output a further-optimized playlist of geo-related assets. In these implementations, if the simultaneous areas submodule [402] has not analyzed all the pairs [518], the next pair in the system can be tested.

Figure 6:
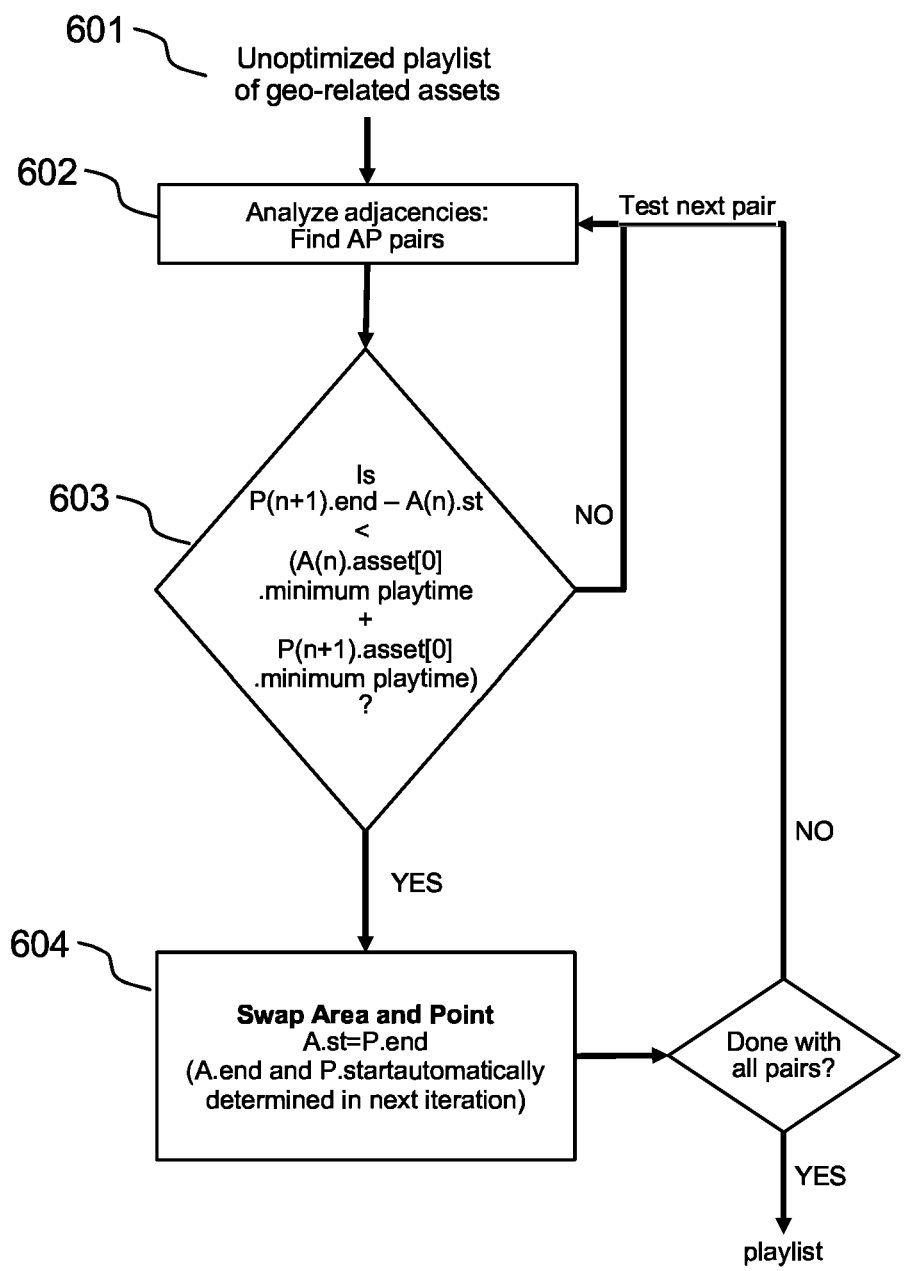
FIG. 6 shows a diagram of an example method for optimizing a playlist of locations and geo-related assets by solving problems of area-point lockups.

As a further example showing greater detail of a sub-module of Module III [108], FIG. 6 shows a diagram of an example sub-module called "Area-Point lockups," [404] a method that can perform certain functionalities for optimizing a playlist of locations and geo-related assets by solving problems of area-point lockups. A "lockup" is herein defined as a situation where a point immediately follows an area in such proximity that, given the predicted motion and speed of the observer, there would not be enough time to play the related assets of either or both of the locations. In some implementations, an unoptimized playlist of geo-related assets [601] can be analyzed for adjacencies [602], to identify where an area's anchor is immediately followed by a point's anchor. In these implementations, where area-point pairs are found, these pairs can be analyzed [603] to determine if there is sufficient time between the two anchors to play the top-chosen assets related to both locations.

This can be determined mathematically by comparing available play-time, calculated as:

$$P(n+1).\text{end} - A(n).\text{start}$$

with the sum of the minimum time for the related top assets for each location, calculated as:

$$A(n).\text{asset}[0].\text{minimum playtime} + P(n+1).\text{asset}[0].\text{minimum playtime}$$

Where there is not enough available play-time to accommodate one or both assets, further action can be taken. This further action can be to swap the area and the point [604], by making the area's start equal to the point's end. This process continues until all current pairs have been tested. Once all current pairs have been tested, a further-optimized playlist can be generated.

Figure 7:
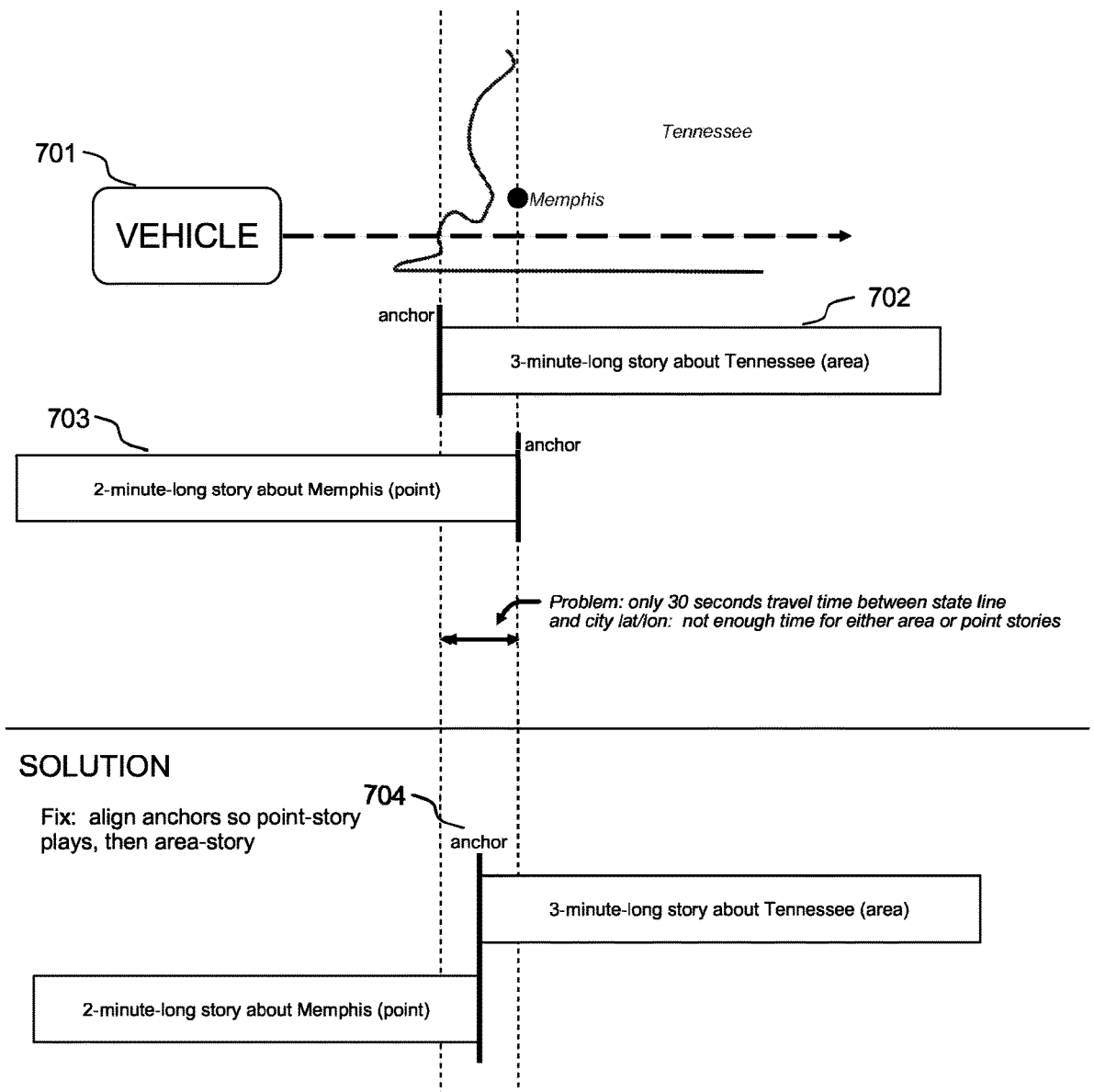
FIG. 7 shows an example method for aligning anchors to solve problems of area-point lockups.

The problem of Area-Point lockups that are addressed in FIG. 6, and its possible solutions, can be further illustrated with a timeline overlaid upon a map, as is shown in FIG. 7. In this illustration, a vehicle [701] travels eastward, approaching the Tennessee state line and Memphis. Analysis predicts that the state line will be encountered first (at the "anchor" time of the area "Tennessee"), followed thereafter by the closest approach to Memphis (at the "anchor" time of the point "Memphis"). However, the related top asset for Tennessee is a 3-minute-long audio story [702], and the related top asset for Memphis is a 2-minute story [703]: so there is not enough time to play either or both assets.

The solution is to align the anchors [704], so that the anchor of the point (Memphis) equals the anchor of the area (Tennessee). The result is that the point now precedes the area in the playlist, and there is now enough time for the Memphis audio to play, followed by the Tennessee audio.

The following two figures illustrate some useful concepts and methods that can be employed within many methods discussed herein.

FIG. 8 shows an example method for determining play-windows of both areas and points. In some implementations, the play-window of an area [801] can begin when the observer is predicted to cross a border and enter the area, and can end when the observer is predicted to cross a border and leave the area. In some implementations, the play-window of a point [802] can begin at a certain distance preceding the closest approach to the point, which distance can be calculated as optimal, considering the current and predicted speed of the vehicle. In these implementations, the play-window of the point can end, for example, at the closest approach to the point.

Figure 9:
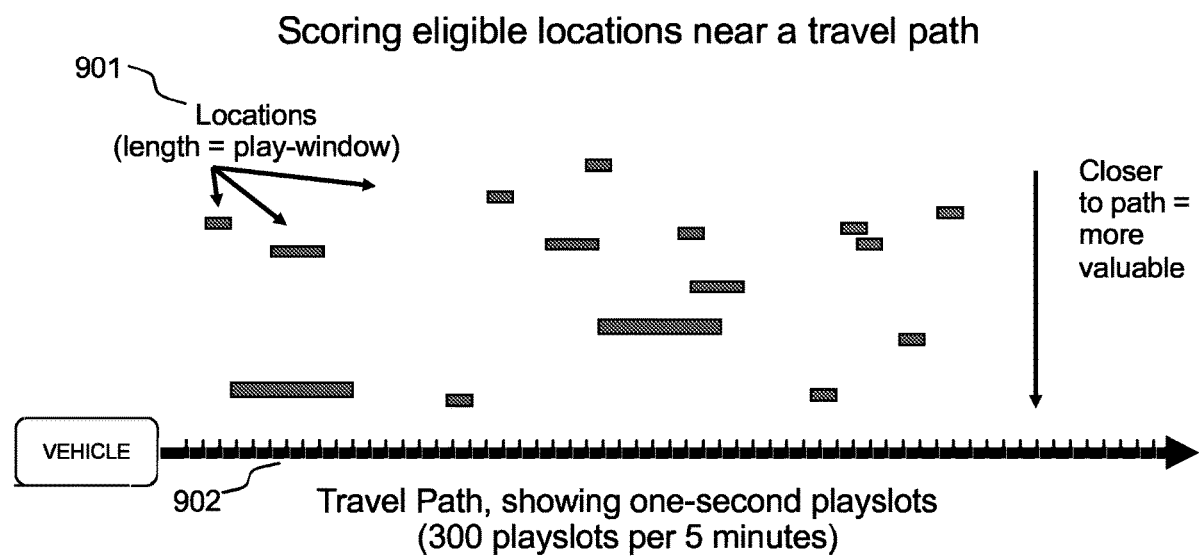
FIG. 9 shows a diagram of an example method for rating eligible locations near a travel path.

FIG. 9 shows a diagram of an example method that can perform certain functionalities for scoring eligible locations [901] near a travel path [902]. In some implementations, a score can be assigned to each eligible location in a playlist, to help determine the location's presence in and/or position in the sorted list of eligible locations. In these implementations, a lower score creates a greater imperative to place a location within the list at its moment of lowest score. The score can be partially determined by Scoring Factors [903] including the following:

Scoring factors can include Distance from path: locations closer to the predicted path can receive lower scores and hence a greater imperative to place the location in the list.

Scoring factors can include Length of asset: the length of an asset associated with a location can affect its score. For example, a long audio story of 30 minutes may make it impractical to place in a crowded list. Its high score, derived from its long length, makes it less imperative to include in the list.

Scoring factors can include Shift tolerance: this can rate how easily the location's anchor can be moved forwards or backwards in the playlist, and remain relevant to the observer. Shift tolerance can increase with a location's distance from the path, making its score higher and its imperative for placement reduced: a far-away location may remain relevant if its anchor is shifted greatly, since it still may be observable to the user, while the anchor of a close-up location may not be moved as much without becoming unobservable to the user. Areas naturally have greater shift tolerance than points, since there may be more time to play an asset while within an area, rather than close to a point, which cannot by its nature be moved.

In some instances, scores can be calculated for various factors using, for example, a semi-arbitrary scale of 0 to 10, with 0 being most imperative and 10 being least imperative. A total score may be the sum of scores of all factors, so an instance that uses three factors of, for example, Distance from Path, Length of Asset, and Shift Tolerance, can have a total score range of 0 to 30.

Consider the example of an airplane that is flying north from Miami along the east coast of Florida along the shore. An audio story about the city of Orlando might have a low score of 5 in this situation, because the airplane will fly right over it, making its distance from path low, for a score of 3, its length of asset may be a short audio story of half a minute, making it easy to slip into the list, for an additional score of 2, and its shift tolerance is 0: as a city, it cannot move, and it cannot be mentioned relevantly at any other times than during its flyover.

On the other hand, an audio story about the Atlantic Ocean, on the starboard side, might have a higher score: although it is close and has a low "distance" score of 2, and its asset length might be a modest five-minute-long audio story for an asset-length score of 4, it has enormous shift tolerance of 10, since it will be there (and relevant to the storytelling) as long as the airplane flies over it. Its total score of 16 may put it out of contention for inclusion in the list, at least for the time being. Thus, in some implementations, a score is used to determine if an asset can be scheduled in the currently-considered timeslot, if it should be shifted to a later or earlier timeslot, or if it should be ignored altogether in favor of one or more lower-scoring assets.

Part Two: Hardware

Whereas the preceding paragraphs describe systems and methods for presenting geo-triggered assets, the following paragraphs describe hardware that can be used to execute these systems and methods for presenting geo-triggered assets.

Figure 10A:
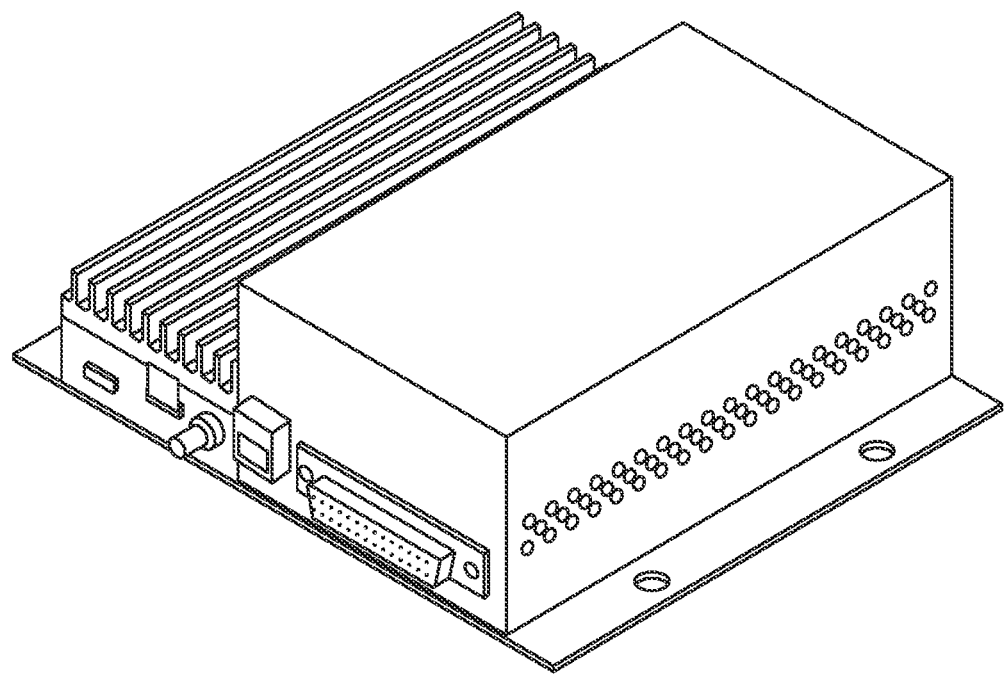
FIG. 10A shows an example server for processing and displaying geo-triggered assets.

FIG. 10A shows an example server, labeled GojiBox®, that in some implementations can generate geo-triggered data including entertainment data and information data including, for example but not limited to, maps, photographs, videos, movies, audio, text, and other media assets. In these implementations, data can be generated by determining a current position, selecting geo-relevant multimedia assets from storage, and serving the selected geo-relevant multimedia assets to viewers using multiple methods, such as video screens and personal devices using wi-fi.

In some implementations, the server can be a simple single board computer (SBC) with an ARINC 429 interface to receive aircraft data. In some implementations, the server can also include an aircraft-ready power supply and sufficient hold-up for normal aircraft transients, an LTE modem for on-ground communications, and multiple video outputs.

In some implementations, the server can store and serve moving map images and data, store and serve geo-triggered audio and video files, host and run applications, and automatically update configuration files.

Figure 10B:
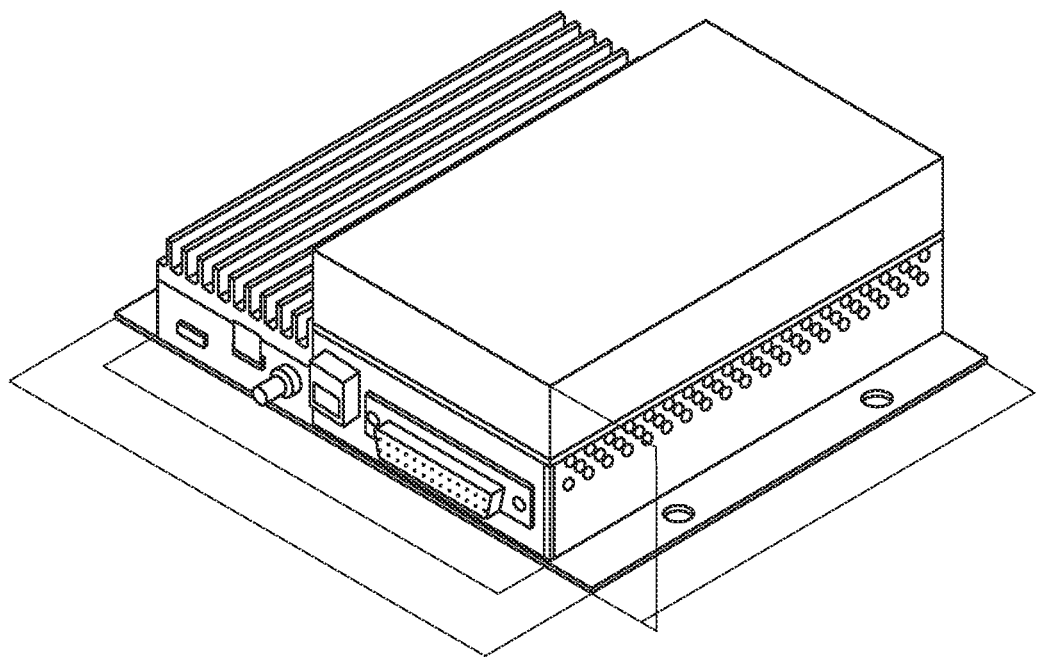
FIG. 10B shows example dimensions for an example server for facilitating geo-triggered assets.

FIG. 10B shows example dimensions for a server for facilitating geo-triggered entertainment. In some implementations, dimensions can be very small and compact (e.g., 5"×5"×2" and 1-3 pounds), and power consumption can be 50 watts. In some implementations, the enclosure can be a sheet metal box. In these implementations, a small, compact, and light weighing server saves space and minimizes cost in any transportation vehicle it is placed. Most information and entertainment systems weigh greater than three pounds and are very costly to use in travel. For example, reducing the weight on an airplane by a pound could save thousands of dollars a year. Removing a heavier system (e.g., fifteen pounds), and replacing it with the compact GojiBox® (e.g., one and a half pounds), could save tens of thousands of dollars each year in flight.

In some implementations, the server can be designed and tested to aerospace standards, including for example RTCA DO-106G, FAR Part 25.853, and FAR Part 25.869.

Figure 10C:
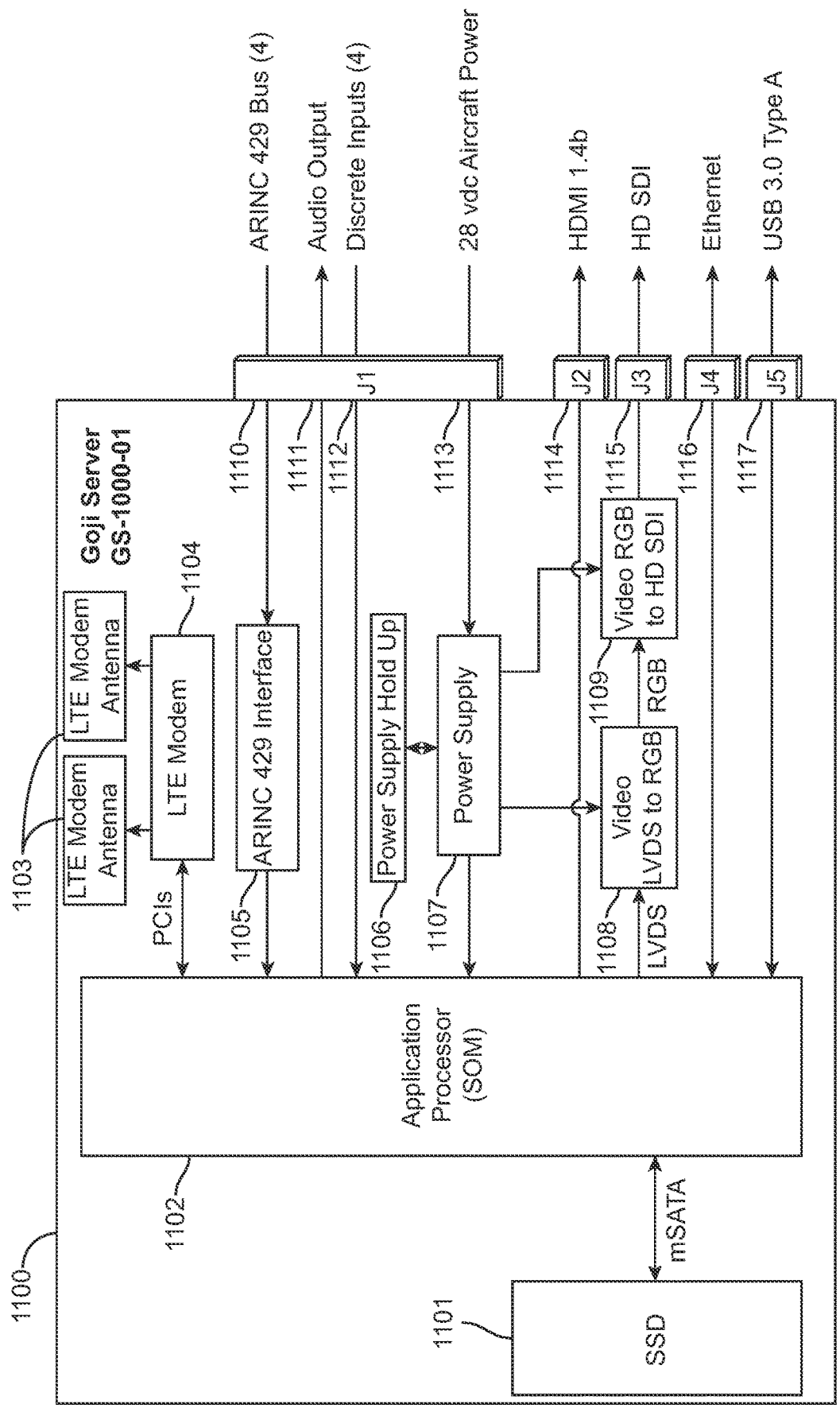
FIG. 10C shows the internal components in an example server for facilitating geo-triggered assets.

FIG. 10C shows the internal components in an example server [1100] for creating and serving geo-triggered entertainment.

The following paragraphs describe an example scenario, as seen in FIG. 10C, illustrating the flow of data through an example server [1100].

A geo-triggered entertainment system needs to know where it is. In some implementations, for example in airplanes, location data can be provided by the airplane's data system, through a widely-used well-known standard called ARINC 429. This is named after a company established in 1929 called Aeronautical Radio, Incorporated, which created the standard and popularized it throughout the aviation industry.

In the example shown in FIG. 10C, ARINC 429 flight data can be received through an ARINC 429 bus [1110], and processed using an ARINC 429 interface [1105]. In some instances, this interface can be a Holt HI-8454 module or similar, and can implement 4 channels of ARINC 429 data.

ARINC 429 flight data has various types of data called "labels." Examples of labels are latitude, longitude, altitude, and departure city. FIG. 11 shows example ARINC 419 labels. Other ARINC 419 labels are also possible.

As in the example shown in FIG. 10C, the ARINC data can be sent to an Application Processor [1102], whose form can be a System on a Module (SOM) for example. In some instances, this Application Processor [1102] can be a Toradex NVIDIA Tegra K1 COM—Apalis TK1, for example, utilizing an ARM or better. In some instances, the Application Processor [1102] can be optimized to meet the functional requirements of the server, while drawing the lowest power possible. In some instances, the Application Processor can run Linux and implement 2 GB of DDR3 or better.

As in the example shown in FIG. 10C, the Application Processor [1102] can execute one or more algorithms, using methods such as those described above, to determine which assets to present. In some implementations, the Application Processor [1102] can then access these assets from a storage module, here labeled SSD (Solid State Drive) [1101] In some implementations, the storage module can contain assets including moving map images, software applications, audio files, UHD video, HD video, and SD video files. In some implementations, this storage module can be a Samsung EVO 860, for example, with 1 TB of mSATA solid-state storage.

In some implementations, the Application Processor [1102] can create two kinds of video signals (HDMI and LVDS), as well as a stream of HTML data.

As in the example shown in FIG. 10C, in some implementations the Application Processor [1102] can send HDMI video directly to an HDMI output [1114]. This can be an HDMI 1.4b output, capable of the most current standard of HDCP, utilizing a standard locking HDMI connector. In some implementations, an HDMI cable (not depicted) can be connected to a video monitor (not depicted), where the HDMI signal can be viewed.

As in the example shown in FIG. 10C, some implementations of the server require video conversion to create an HD SDI video signal. In these implementations, the server can include a video LVDS to RGB video converter [1108] and/or a video RGB to HD SDI converter [1109]. For example, video converter [1108] can convert low-voltage differential signaling (LVDS) video to RGB video. In some implementations, this converter can be a Thine THC63LVD824A-B-ND, for example, or similar. Another video converter [1109] can convert the subsequent RGB video into HD SDI video, which then can be supplied to the HD SDI output [1115]. In some implementations, this converter can be a Semtech GS1662-IBE3-ND, for example, or similar. In some implementations, a coaxial cable (not depicted) can be connected from the HD SDI output to a video monitor (not depicted), where the HD SDI signal can be viewed.

As in the example shown in FIG. 10C, in some implementations the application processor can send HTML content to an ethernet interface [1116]. In some implementations, this can be a 1 Gb ethernet port. In some implementations, an ethernet cable (not depicted) can be connected from the Ethernet interface [1116] to a wireless server or "hotspot" (not depicted), where the HTML signal can be propagated to nearby wifi-connected devices.

The preceding paragraphs described how geo-triggered entertainment can be created with this server. The following paragraphs describe other possible aspects of the server that can be essential to its functioning.

As shown in FIG. 10C, some implementations of the server can include a USB 3.0 port [1117]. This can be used for loading media onto the on-board storage, or for providing temporary exterior storage and access to media on an external drive, or for access to the server for maintenance. In some implementations, USB 3.0 port [1117] can include a standard locking USB type A connector.

As shown in FIG. 10C, some implementations of the server can include interfaces for stereo audio output [1111] that can be connected via cable to an external audio system or speaker (not depicted).

As shown in FIG. 10C, some implementations of the server can include a power input [1113] that can be connected to a power supply [1107] that can convert input voltage into the voltages required for the server's internal components. In some implementations, the server can turn on and power up upon power application. In some implementations, the server does not have a power switch.

In some implementations, the server can require a nominal input voltage of 28.0 volts DC, with a range between 22.0 VDC and 32 VDC, and maximum input current of 2 amps. In some implementations, when the nominal input voltage is abruptly applied, the peak inrush current can be less than 9 times the maximum steady state load for the first 3.0 msec, 4 times the maximum steady state load for up to 500 msec, and 2 times the maximum steady state load for up to 2 seconds, and nominal thereafter.

To protect against temporary loss of power, in some implementations as illustrated in FIG. 10C, the server can include a power supply hold up capacitor [1106]. In these implementations, the server can maintain functionality under momentary power interruption for up to 300 ms, with a target of 1 second. In these implementations, the server can perform a graceful shut down, without the loss or corruption of any data, when power is lost for over 300 ms.

It can be important for the server to connect to the Internet on a periodic basis, to update content and firmware, and for remote access and maintenance. To enable this, as shown in FIG. 10C, some implementations of the server can include an LTE Modem [1104]. In these implementations, this modem can pre-certified, and can be similar to the Sierra Wireless AirPrime EM7565, for example. In some implementations, the LTE Modem [1104] can be connected to one or more LTE Modem antennas [1103], which can be similar to Taoglas FXUB68.07.0180C antennas, for example.

Because some implementations exist in places where the Internet is often not available, for example in an airplane in flight, it can be advantageous in these implementations to turn off the LTE modem when the Internet is unreachable. In these implementations, the server [1100] can receive an ARINC data signal for airspeed via the ARINC 429 bus [1110], and if the airspeed exceeds a certain threshold, for example, 30 to 50 knots, the server [1100] can switch off the LTE modem [1104]. Subsequently, when the airspeed dips back below the threshold, the server [1100] can automatically switch the LTE Modem [1104] back on.

Another method to switch the modem on and off can be in response to a "Weight on Wheels" ARINC signal. In some aircraft, when the craft is on the ground, its "Weight on Wheels" ARINC label can be "true," meaning the aircraft is on the ground, but when it is aloft, this label can be "false," meaning the aircraft is in flight. In some implementations, the server [1100] can receive the "Weight on Wheels" ARINC data through one of its discrete inputs [1112], and switch its LTE modem [1104] on or off accordingly.

It can be advantageous to pause the server's output when a public address (PA) announcement is occurring. In some implementations, especially in aircraft, it is possible to determine when such announcements are being made, via the ARINC data flow. In these implementations, an ARINC signal labeled, for example, "PA Active" is sent when an announcement is being made, and an ARINC signal labeled, for example, "PA Pause" is sent when an announcement finishes. In example server [1100], as that shown in FIG. 10C, if a signal such as "PA Active" is sent, it can be received via one if the server's discrete inputs [1112]. Upon receiving the signal, server [1100] can, for example, pause content playback, and/or mute audio output, and/or display a customizable PA announcement message. Subsequently, when a signal such as "PA Pause" is sent, server [1100] can revert back to its previous state.

Speed and robustness of data transfer can be important when serving content. In some implementations, server [1100] can stream data off the SSD at a minimum throughput of, for example 300-400 GB/s. In some implementations, server [1100] can stream content to a minimum of 1-100 web clients through a wired ethernet distribution server or "hotspot" (not depicted). In some implementations, server [1100] can stream 60-100 video streams with a compression spec such as H.264 HD, or 20-40 video streams with a compression spec such as H.265 4K. In these implementations, streaming can be done using a wired ethernet distribution server or "hotspot."

In some implementations, server [1100] can transition from a cold ("off") state to fully operational in less than, for example, 60-90 seconds. In some implementations, server [1100] can respond to a "reset" command over ethernet.

Response times can be important. In some implementations, server [1100] can support the overall receipt-to-transmit response time of, for example, 40-60 msec, from the time a request is received by server [1100] until the time the response is delivered to the user.

It is important for a server to maintain proper temperature. In some implementations, the touch-temperature of server [1100] can stay within, for example, 5° C. to 15° C. at an ambient temperature of, for example, 15° C. to 25° C. In some implementations, server [1100] can cool to below, for example, 2° C. to 8° C. above ambient within ten minutes of server [1100] being powered off. In some implementations, server [1100] can be installed such that there is adequate airflow to cool the unit over extended periods of time.

In some implementations, server [1100] can implement convection and/or conductive cooling only. In other implementations, server [1100] can include a fan to regulate its temperature.

Some implementations of server [1100] can include a built-in test, which can be used by server [1100] to continuously monitor and report its health. In these implementations, a test can automatically be run upon initialization and start-up of server [1100], testing all server functionality, and presenting a report via an administrative application. In some implementations, server [1100] can continuously perform non-intrusive built-in tests on itself.

Monitor with Built-In Server

Whereas the preceding paragraphs describe a server that can create a geo-triggered entertainment experience, the following paragraphs describe a monitor with such a server built into it.

Figure 12A:
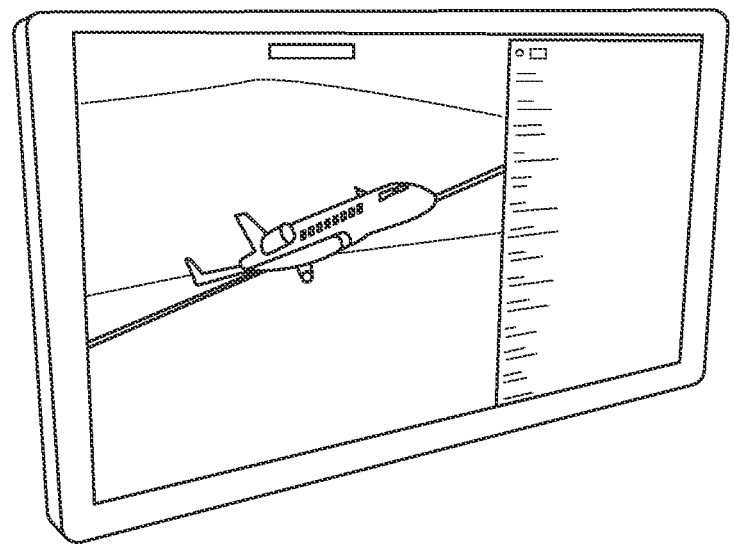
FIG. 12A shows an example monitor for displaying geo-triggered assets.

A server such as server [1100] described above, can in some implementations serve content by, for example, being connected by cable or wifi, to an external monitor. However, for the sake of convenience, cost, and space, in other implementations, it can also be advantageous to embed an entire entertainment system in one device rather than in multiple devices. FIG. 12A ("GojiView Depiction") shows an example monitor. In this example labeled GojiView, the example monitor can display geo-triggered entertainment. In some implementations, a geo-triggered server such as server [1100] described above, or elements of such a server, can be embedded within the monitor itself.

Some or all of the elements included in the server described above, and/or some or all of the functionality of the server described above can be included in such a monitor.

To reduce redundancy, some elements of the monitor, namely those that were described above as part of the server [1100] description, will be described in abbreviated format here. However, elements that are not in the stand-alone server described above, will be described in full below.

Figure 12B:
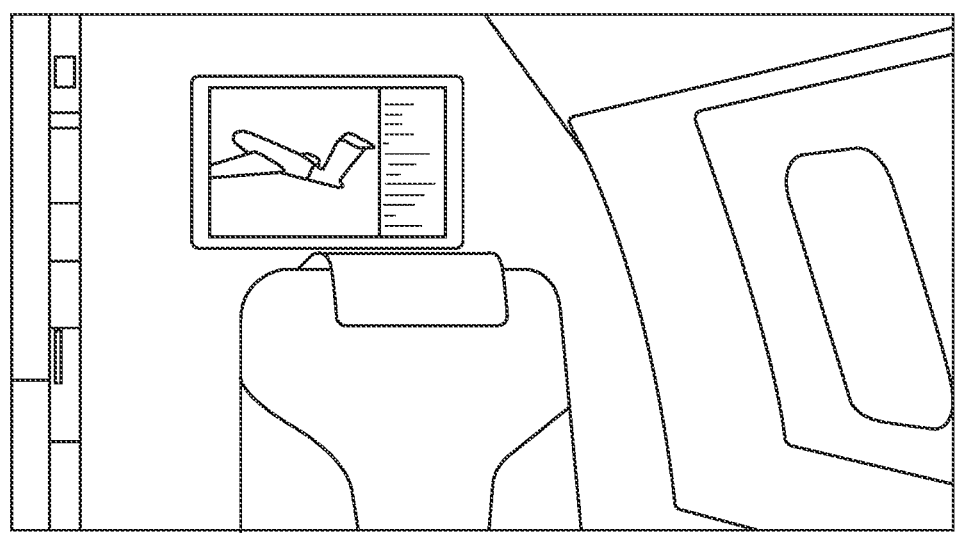
FIG. 12B shows an example embedded monitor for displaying geo-triggered assets.

In some implementations, as seen in FIG. 12B, a monitor capable of facilitating display of geo-relevant content can be mounted on or within, for example, a wall of a cabin, within for example but not limited to, a mode of transportation such as an airplane, a train, a boat, an automobile, or any type of recreational vehicle.

Figure 12C:
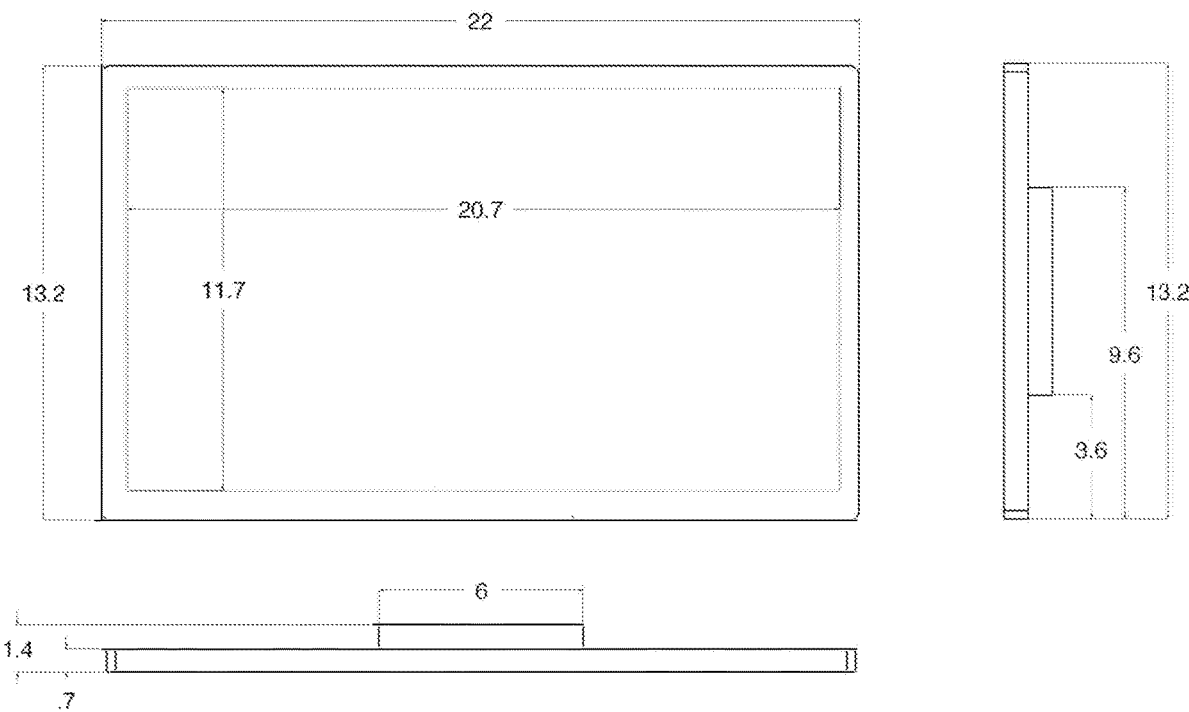
FIG. 12C shows a diagram of example dimensions for an example monitor for displaying geo-triggered assets.

FIG. 12C shows example dimensions for one implementation of a monitor for displaying geo-triggered assets.

The monitor may take different sizes. FIG. 12D shows example height, width, and depth, of three sample implementations. Other implementations are also possible.

The monitor may have different weights. FIG. 12E shows example weight of three sample implementations. Other implementations are also possible.

The monitor may have different connectors. FIG. 12F shows example connectors associated with three sample implementations. Other implementations are also possible. In some implementations, connectors can include a positive retention mechanism.

As with server [1100] described above, in some implementations, the monitor can be designed and tested to aerospace standards, including for example RTCA DO-106G, FAR Part 25.853, and FAR Part 25.869.

Figure 13:
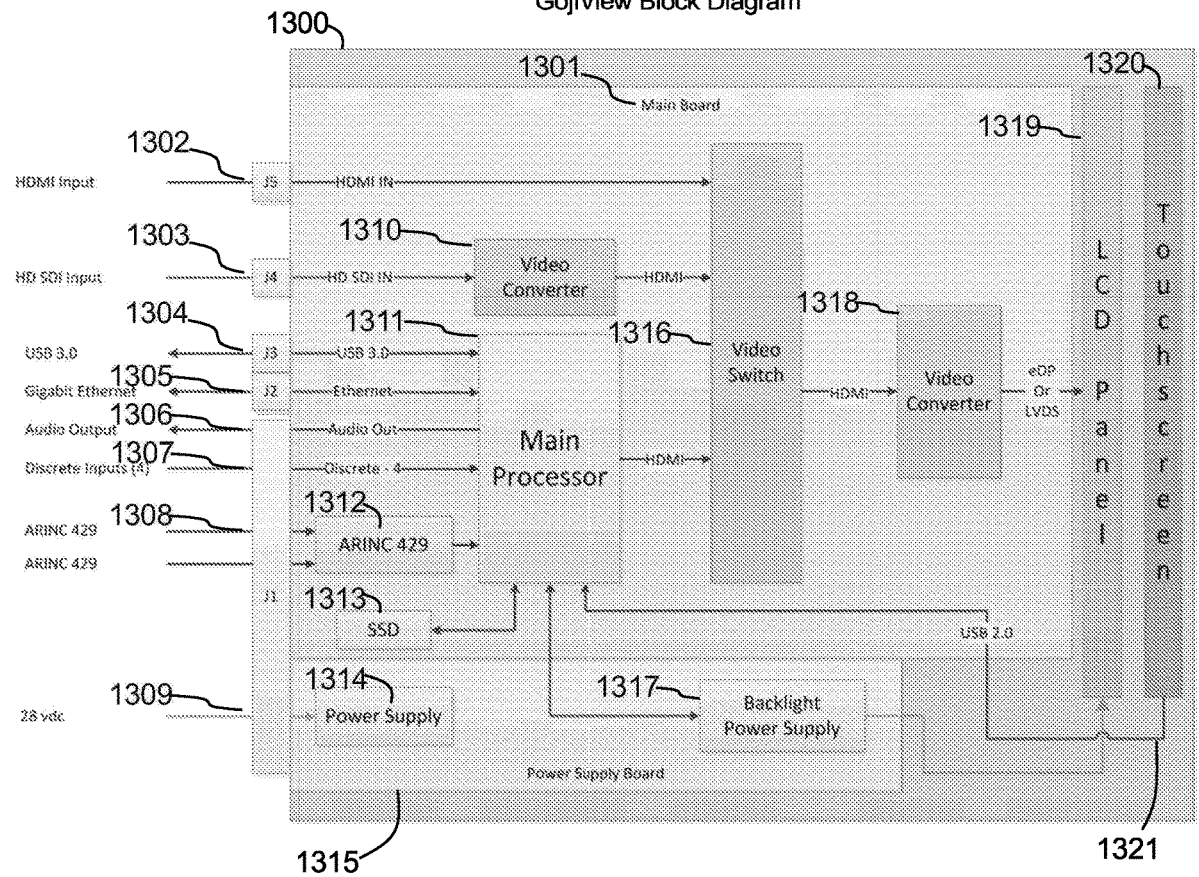
FIG. 13 shows the internal components for an example monitor for processing and displaying geo-triggered assets.

FIG. 13 shows the internal components in an example monitor [1300] for facilitating and displaying geo-triggered entertainment.

As seen in FIG. 13, in some implementations, ARINC 429 flight data can be received through an ARINC 429 bus [1308], and processed in an ARINC 429 interface [1312]. Further details are described in the server [1100] description above.

As seen in FIG. 13, in some implementations, the monitor [1300] can include a Main Board [1301], which can contain one or more components. In some implementations, ARINC data can be sent to a Main Processor [1311]. Further details are described in the server [1100] description above.

As seen in FIG. 13, in some implementations the Main Processor [1311] can access assets from a storage module [1313]. Further details are described in the server [1100] description above.

As seen in FIG. 13, in some implementations the main processor can create HDMI video, which can be passed to a Video Switch [1316].

In addition to the functionality described in the server [1100] description above, in some implementations, the monitor [1033] can accept and process external sources of video. As shown in FIG. 13, such external video can be, for example, HDMI input via for example an HDMI 1.4b input [1302], and/or HD SDI input via for example a standard Micro BNC connector [1303].

To handle external HD SDI video signal, some implementations can include a video converter [1310] to convert the external HD SDI signal to HDMI.

To handle multiple possible sources of video both internal and external, some implementations can include a video switch [1316]. In some implementations, inputs into this switch can include external HDMI, external HD SDI via a video converter [1310], and video directly from the Main Processor [1311].

In some implementations where the video signal must be converted to a different format, the monitor [1300] can include a video converter module [1318], to convert the video signal from, for example, HDMI, to for example, eDP or LVDS.

The video signal can then be displayed via, for example, a video screen. As shown in FIG. 13, some implementations can include an LCD Panel [1319], with resolution at, for example, 1080p60, 4K, 8K, or higher. In some implementations, the display panel can be capable of 24-bit color or better for gradients, with a display controller able to drive 24-bit color or better. In some implementations, brightness can be at least 200 cd/m2 or brighter, a contrast ratio greater than ten-thousand to one (10,000:1), and color depth of at least 16.7M colors, and all color and brightness parameters can be adjustable. In some implementations, the monitor can have viewing angles of at least 178° Horizontal and 160° Vertical. In some implementations, the display can have a MIPI DSI or RGB interface. In some implementations, the panel can have an Aspect Ratio of 16:9.

As shown in FIG. 13, some implementations of the server can include a multi-touch touchscreen panel [1320] with a capacitive touchscreen and a minimum of 4 points. In some implementations, the capacitive touchscreen can have a USB 2.0 interface [1321] with an integrated controller.

In some implementations, the main processor can send HTML content to an ethernet interface [1305] for connection to a wireless server or "hotspot". Further details are described in the description of server [1100] above.

As shown in FIG. 13, some implementations of the monitor can include a USB 3.0 port [1304]. Further details are described in the server [1100] description above.

As shown in FIG. 13, some implementations of the server can include interfaces for stereo audio output [1306]. Further details are described in the server [1100] description above.

As shown in FIG. 13, some implementations of the monitor [1300] can include a Power Supply Board [1315] that can contain a power input [1309] that can be connected to a power supply [1314]. In some implementations, monitor [1300] can turn on and power up upon power application. In some implementations, monitor [1300] does not have a power switch. In some implementations, the power supply can provide power and control to the LCD backlight [1317].

In some implementations, monitor [1300] can require a nominal input voltage of 28.0 volts DC. Further details are described in the server [1100] description above.

Some implementations of the monitor can include an LTE Modem and LTE antennas (not depicted) for communication with the Internet. Further details are described in the server [1100] description above.

In some implementations, monitor [1300] can receive data signals for airspeed via the ARINC 429 bus [1308], and "weight on wheels" signals via the discrete inputs [1307], to determine when the monitor can switch off its LTE modem. Further details are described in the server [1100] description above.

In some implementations, the monitor can receive data signals for PA announcement status via discrete inputs [1307], to determine when content may need to be paused. Further details are described in the server [1100] description above.

Speed of data transfer for implementations of the monitor can be similar to those of server [1100], described above.

Operational readiness parameters, response times, and temperature requirements and controls, of the monitor can be similar to those of server [1100], described above.

Some implementations of the monitor can include a built-in test. Further details are described in the server [1100] description above.

Part Three: Architecture

Whereas the foregoing describes example methods and hardware for providing example geo-relevant content, the following describes how these methods and hardware can work together in an example networked system. When a person travels, and their vehicle is equipped with the foregoing-described hardware, they can experience geo-relevant content. Additionally, because the hardware is networked to a central computer via the Internet, the experience can be controlled and modified remotely. The present implementation architecture can include one or more servers that can work in coordination. These servers can include one or more elements, such as a remote web application, a local web application, firmware, a web server, and/or cloud ware.

Figure 14:
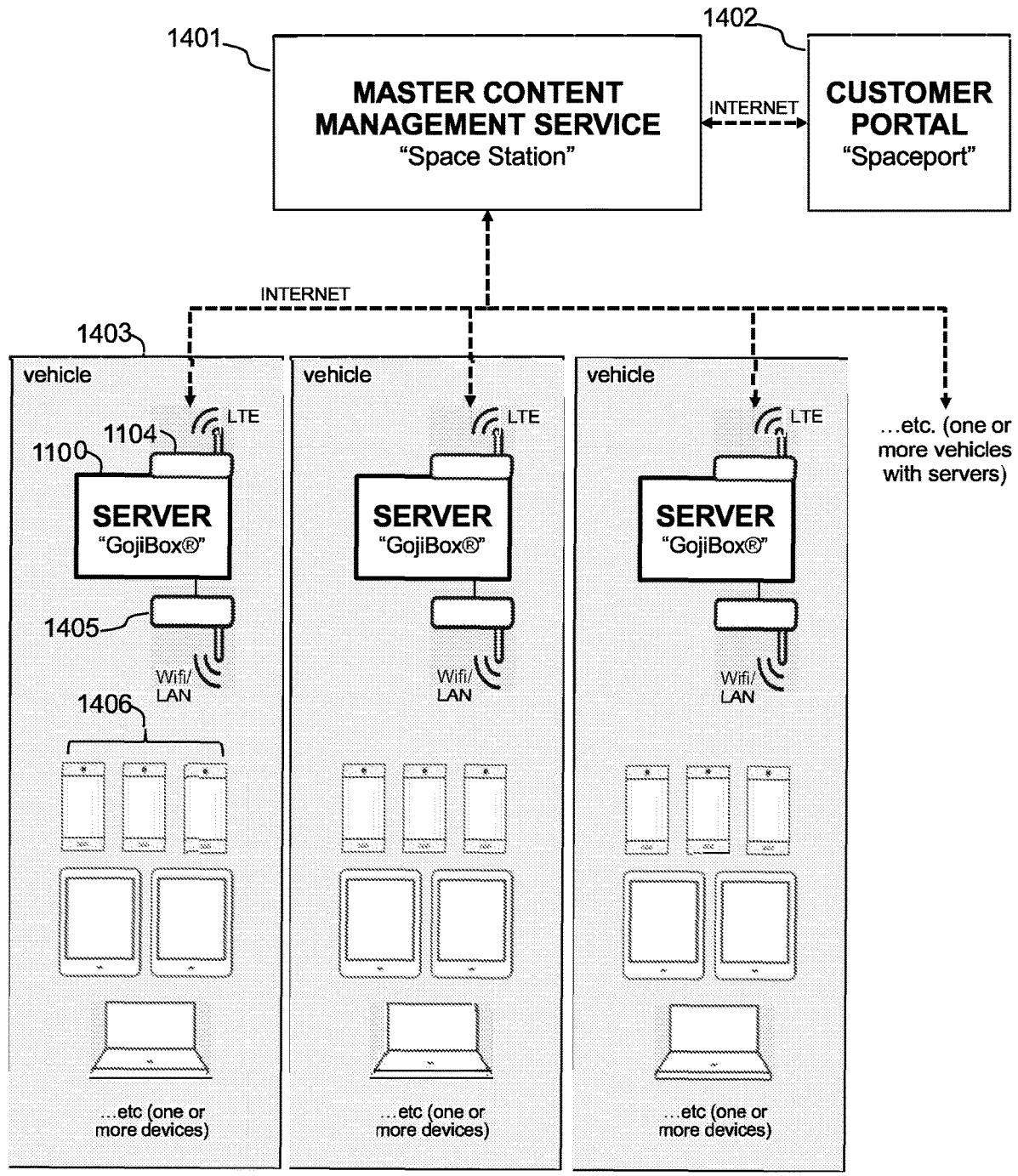
FIG. 14 shows an example infrastructure for facilitating interaction with the geo-triggered assets.

FIG. 14 shows an overview of an example architecture for such a system. In some implementations, a Master Content Management Service [1401], in this example labeled "Space Station," can be a cloud service that can perform many functionalities, including storing and syncing user settings and content for a server, pushing content to specific servers in the field, and listening for a server to request updates.

In these implementations, a Customer Portal [1402], in this example labeled "Spaceport," can include a function to manage the content and settings of a specific server. For example, using a remote web application, settings that change the functionality of a local web application can be managed.

In these implementations, one or more vehicles [1403] can contain a server [1100] (as described above, and in this exampled labeled "GojiBox®") which can use a modem [1104] to connect with the Master Content Management Service [1401]. Additionally, in these implementations, the server [1100] can be connected to a wifi modem or LAN [1405], which in turn can be connected to one or more devices [1406] within the vehicle.

In these implementations, the devices [1406], can include, for example but not exclusively, smartphones, tablets, laptops, desktop computers, smartwatches, smart speakers, or other devices that can receive and display and/or play content.

In these implementations, the one or more vehicles [1403] can include, for example but not exclusively, cars, buses, trains, boats, ships, monorails, airplanes, helicopters, or other vehicles.

Figure 15:
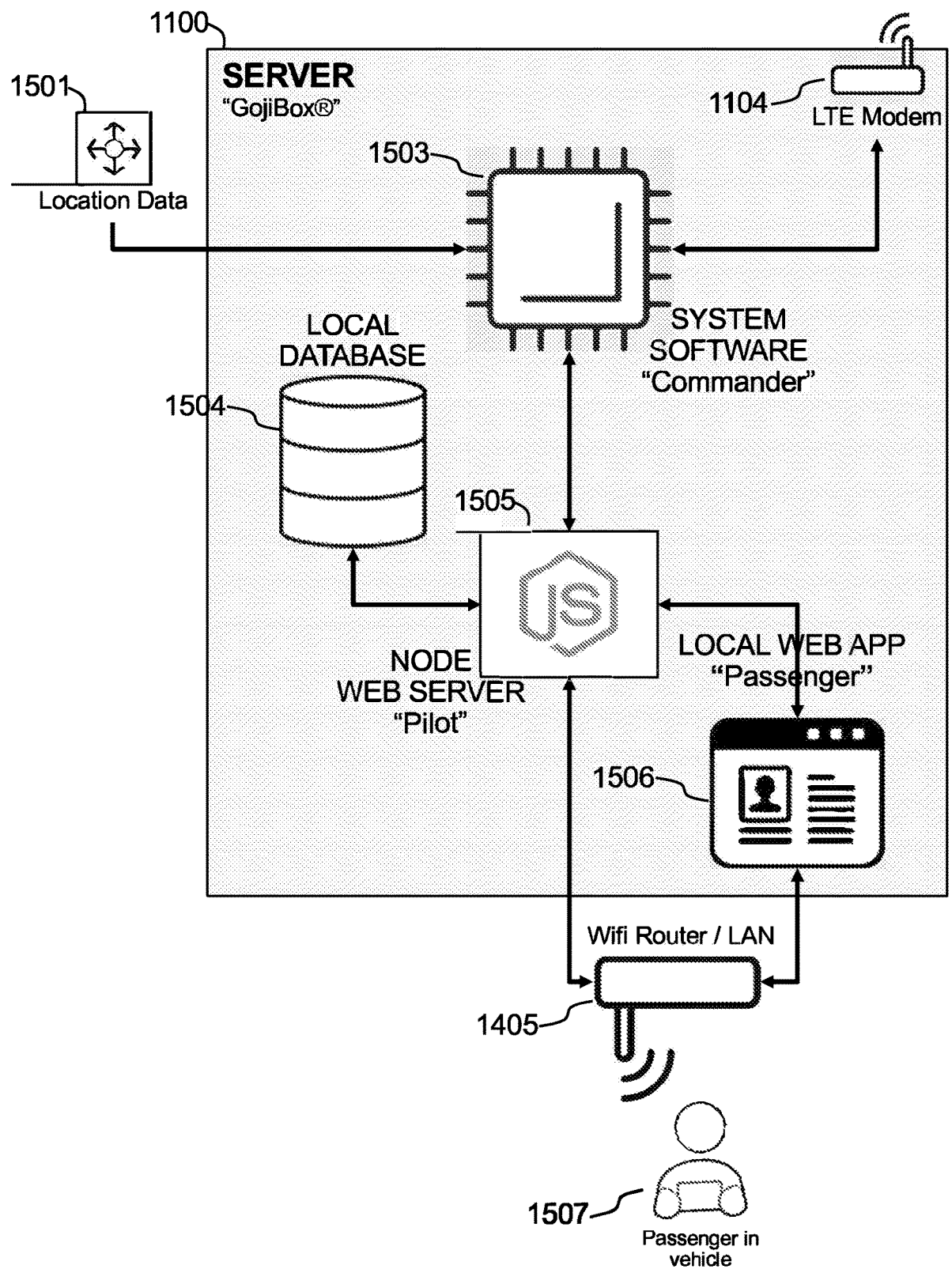
FIG. 15 shows an example interface for displaying multi-media concurrent with a location.

FIG. 15 shows a server [1100], in this example labeled GojiBox®. In these implementations, the server [1100] can include system software [1503], in this example labeled "Commander." In these implementations, this software can include low-level server software, operating server, and/or one or more device drivers, that can exist directly on the server hardware. In these implementations, this software can be responsible for running the server's higher-level applications, receiving and parsing input data from the vehicle including location data [1501], and communicating with a cloud service using a server modem [1104] (e.g., to convey user settings and content, updates to software, and/or analytical and usage data).

In these implementations, a web server [1505], in this example using Node.js and labeled "Pilot," can facilitate communication between the server [1100] and one or more users such as passengers in a vehicle [1507], via a wifi router or LAN [1405]. Example communications can include user settings, points of interest data, vehicle location, and route information. The web server [1505] can also run multiple algorithms that embody the methods such as those in Module I [102], Module II [104], Module III [106] and Module IV [108], described above, to determine one or more geo-relevant assets (e.g., point of interest playlist data to be presented to users). Additionally, the web server [1505] can serve the geo-relevant assets, and other assets, from a local or remote database [1504].

In these implementations, a local web application [1506], in this example labeled "Passenger," can enable users such as passengers [1507] to interact with one or more applications via a wifi router or LAN [1405]. For example, users can interact with a local web application [1506] using a web browser.

Figure 16:
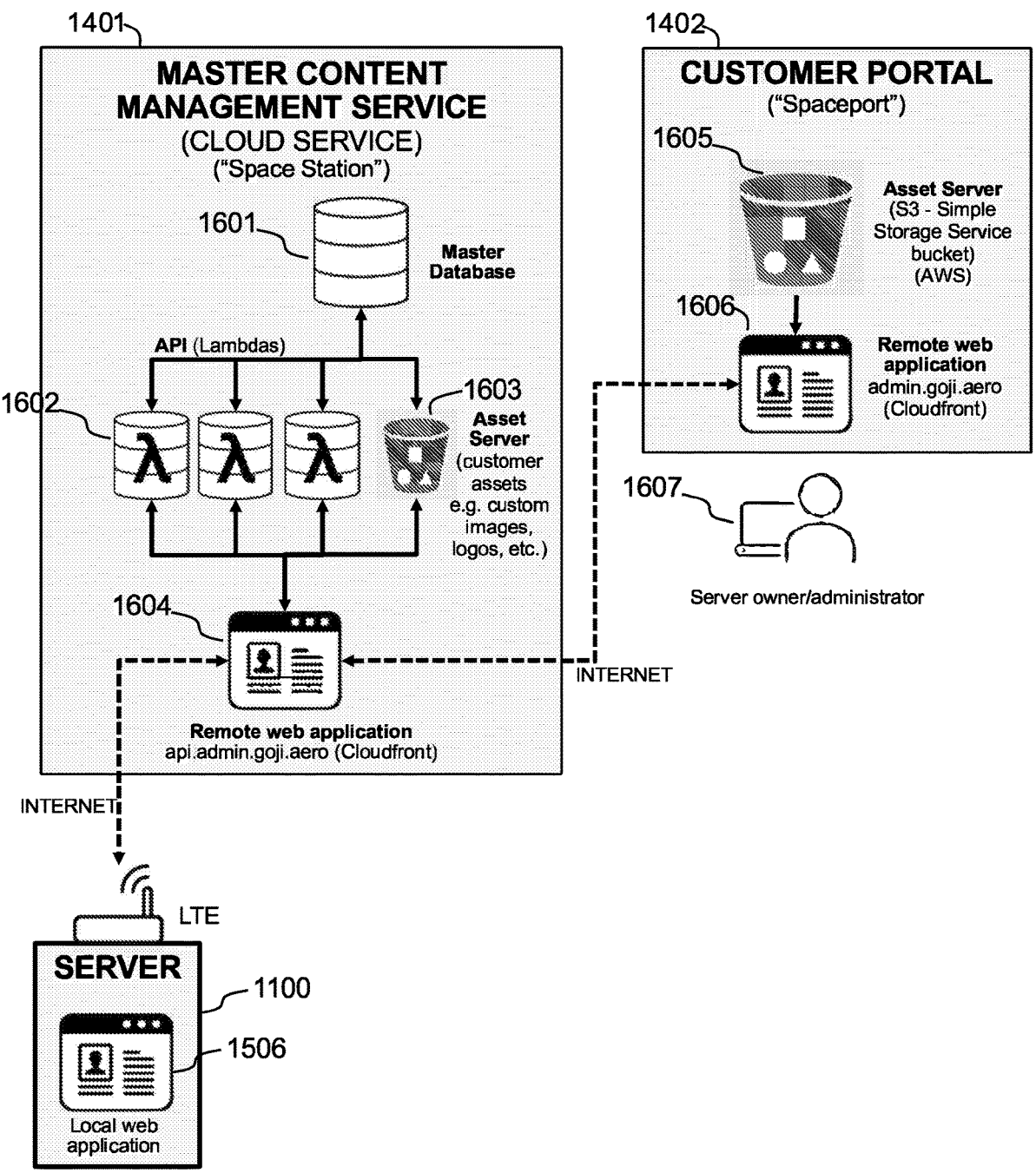
FIG. 16 shows example architecture of a system by which users can control their user experience and server configuration.

FIG. 16 shows example architecture of a system by which users can control their user experience and server configuration.

A Customer Portal [1402], in this example labeled "Spaceport," can include one or more remote web applications [1606] that are hosted on one or more servers in the cloud. Logging into this web application [1606] on the Internet, a server owner or administrator [1607] can manage the content and settings of a specific server (e.g., server [1100]). For example, using a remote web application [1606], settings that change the functionality of a local web application [1506] on a server [1100] can be managed. Settings can include language preference, units of measurement, and one or more interface elements. Settings can be pre-determined or default and changeable automatically or manually. A remote web application [1606] can enable users to upload content such as music, movies, and custom points of interest to be broadcast from an asset server [1605] to a local web application [1506]. A remote web application [1606] can communicate directly with a cloud service such as a Master Content Management Service [1401] to read and update data stored in the cloud service's databases [1601].

In some implementations, the infrastructure described herein can enable users [1607] to log in (e.g., with a username and password), and experience a customized experience. Customizations can include the user's preference of graphics, colors, type of vehicle depicted in the map, content selection such as the user's selection of music and movies, and custom text such as the user's name. Custom data per user can be stored in a database [1601] on in a cloud service such as a Master Content Management Service [1401]. In other implementations, custom data per user can be stored on a local server or a remote server.

Some examples of users [1607] who may want to customize their servers [1100] can include private jet owners who want to upload movies to their plane's server from the comfort of their home before they fly, bus companies who want to update the photographs on their points-of-interest, train lines who may want to change the stories that passengers hear as they take trips by rail, and advertisers who want to create and continually update geo-triggered audio advertisements that car passengers hear when they drive along the highway near businesses that are being advertised.

Additionally, using the customer portal [1402] and its web applications [1606], engineers can update the firmware and perform remote maintenance on one or more servers [1100].

In some implementations, the infrastructure can employ machine learning and artificial intelligence to further enhance the user's experience. Using these methods, the infrastructure can monitor the user's selections, and then in the future make predictive calculations to present the user with one or more options (e.g., regarding content, destination arrangements, purchases, etc.), that the server determines may be preferable to the user.

A cloud service, in this example labeled Master Content Management Service or "Space Station" [1401], can include one or more databases [1601], binary assets in asset servers [1603], Application Programming Interfaces ("API") [1602], and/or remote web applications [1604]. The cloud service can perform many functionalities, including storing and syncing user settings and content for a server [1100], pushing content to specific servers in the field, and listening for a server to request updates (e.g., using a modem).

Figure 17:
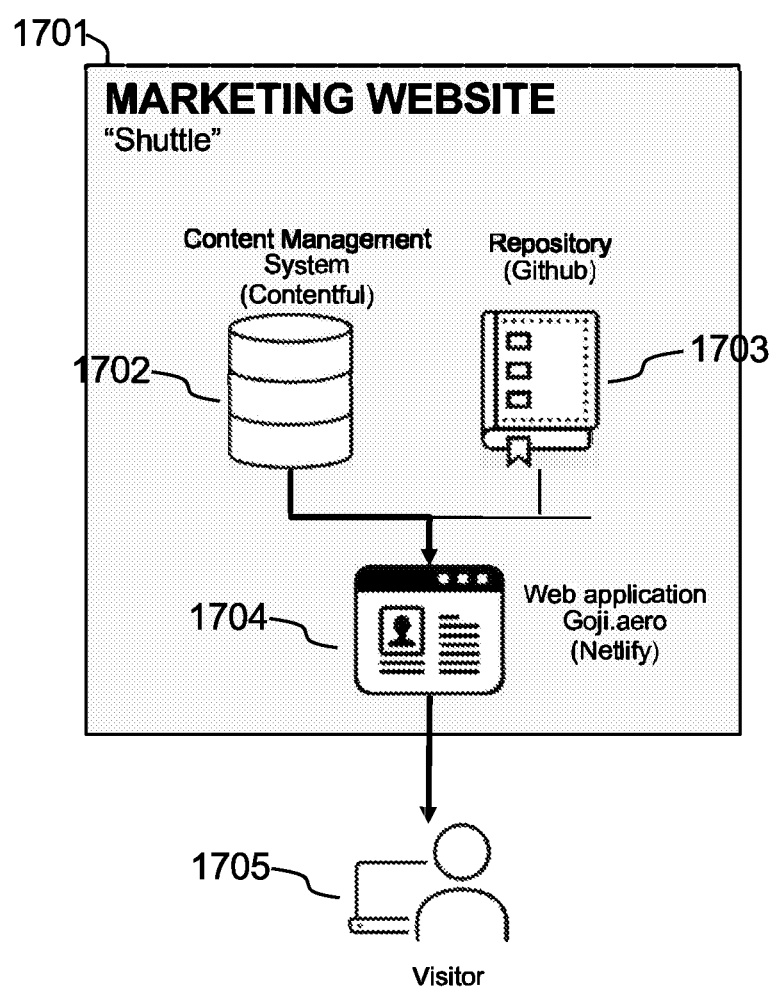
FIG. 17 shows example architecture of a marketing website.

FIG. 17 shows example architecture of a marketing website [1701], in this example labeled "Shuttle." In this implementation, a Content Management System [1702] provides assets and a Repository [1703] provides code to a web application [1704], which visitors [1705] can access via the Internet. In some implementations, the web application [1704] has interactive access to the Master Database [1601]

of the Master Content Management Service (discussed above), so that the marketing website [1701] can show one or many of the assets and other data that are also being accessed by the servers [1100], giving website visitors [1705] a dynamically changeable "live" view of the most up-to-date content available.

Figure 18:
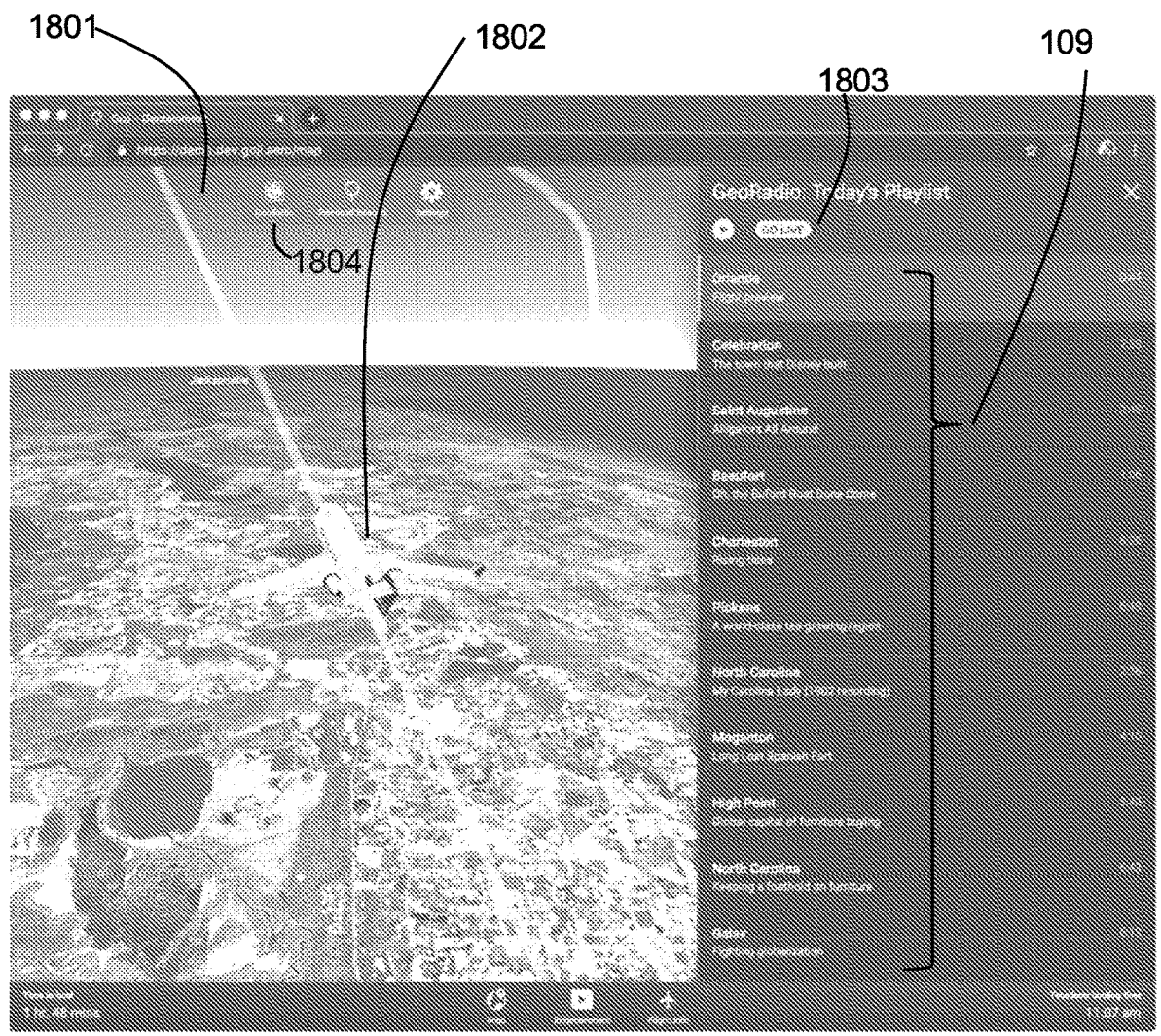
FIG. 18 shows an example interface for displaying location information and one or more options for displaying multi-media relevant to the location information.

FIG. 18 shows an example interface for displaying multi-media concurrent with a location. In some implementations, geo-location information is used to determine one or more geo-triggered, geo-relevant assets as a mode of transportation approaches, coincides with, and/or passes by the asset. In some implementations, an interface can be embedded or made part of a map. In these implementations, as the map [1801] depicts the geo-location of the transportation vehicle [1802], one or more interactive assets which can be listed in a playlist [109] can be associated with the geo-location and displayed as part of a map or other graphical interface.

In this example, playlist [109] is the optimized playlist of assets shown in FIG. 1 and elsewhere. In some implementations, the playlist can be dynamically generated as the server receives geo-location information associated with a transportation vehicle. In the event that a transportation vehicle alters course, the server can dynamically update and display one or more newly geo-relevant assets. The assets on the playlist can play or be seen as the transportation vehicle is geo-relevant to the asset. Additionally, assets can be individually selected (e.g., if a user would like to interact with an asset that is no longer or not yet geo-relevant). Additionally, an interactive element (e.g., a "go live" button or link) [1803], can be used to return the execution of the playlist to the current geo-relevant location.

In some implementations, one or more geo-relevant assets can be available for execution by the server (e.g., in a "stack" of assets for a particular geo-location). For example, in these implementations, if a user wants to continue engaging in assets relevant to a particular location (e.g., Orlando), the server can cycle through the one or more relevant (Orlando) assets for the user even if they are no longer relevant to the location of the transportation vehicle (e.g., now in or over North Carolina). In this example, once the user has cycled through all the relevant assets for the particular location, the user can select a different asset or the user can select the "go live" interactive element [1803] to return to the current geo-relevant programming.

In some implementations, the server can automatically display a map including selectable interactive geo-relevant assets as a default interface. In FIG. 18, one or more audio assets are also displayed as elements of a playlist [109]. The one or more audio assets can form audio programming (e.g. as in this example labeled GeoRadio). Additionally, a user can use an interactive element to engage or execute geo-relevant programming (e.g., the GeoRadio link/button [1804] depicted on the display). In some implementations, the display of the map and the assets can follow a predictable pattern or change randomly. In these implementations, the server can determine that a change between the map and an asset is needed (e.g., the asset has been displayed a threshold amount of time), or the server can determine that a change is desired when interactive information is received corresponding to a selection of the map (e.g., when the map is not shown), or the audio programming (e.g., when the audio programming is not shown), or the visual asset (e.g., when the visual asset is not shown). As noted in the FIGs, and as described herein, both the map and an asset can be displayed simultaneously or in succession (e.g., according to an order or random timed or un-timed changes).

Figure 19:
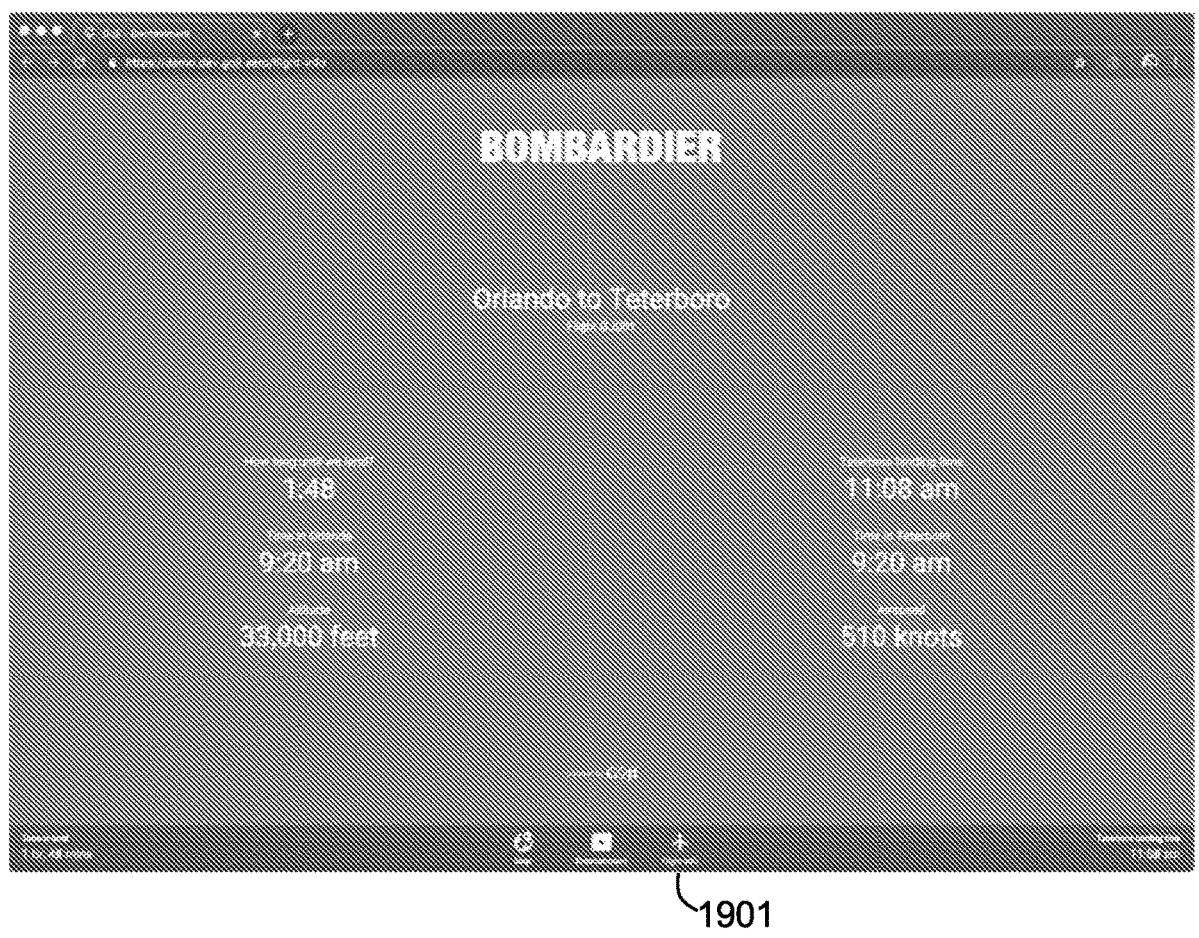
FIG. 19 shows another example interface for displaying location information.

FIG. 19 shows an example interface for displaying location information. In some implementations, the location information interface can appear automatically (e.g., at one or more random times or on a pre-determined schedule) or manually (e.g., upon receiving input corresponding to a user selection of the location information interface). For example, display of the location information can be initialized upon receiving an indication of an interaction with an interactive element (e.g., a link or a button such as a "flight info" button [1901]).

Figure 20:
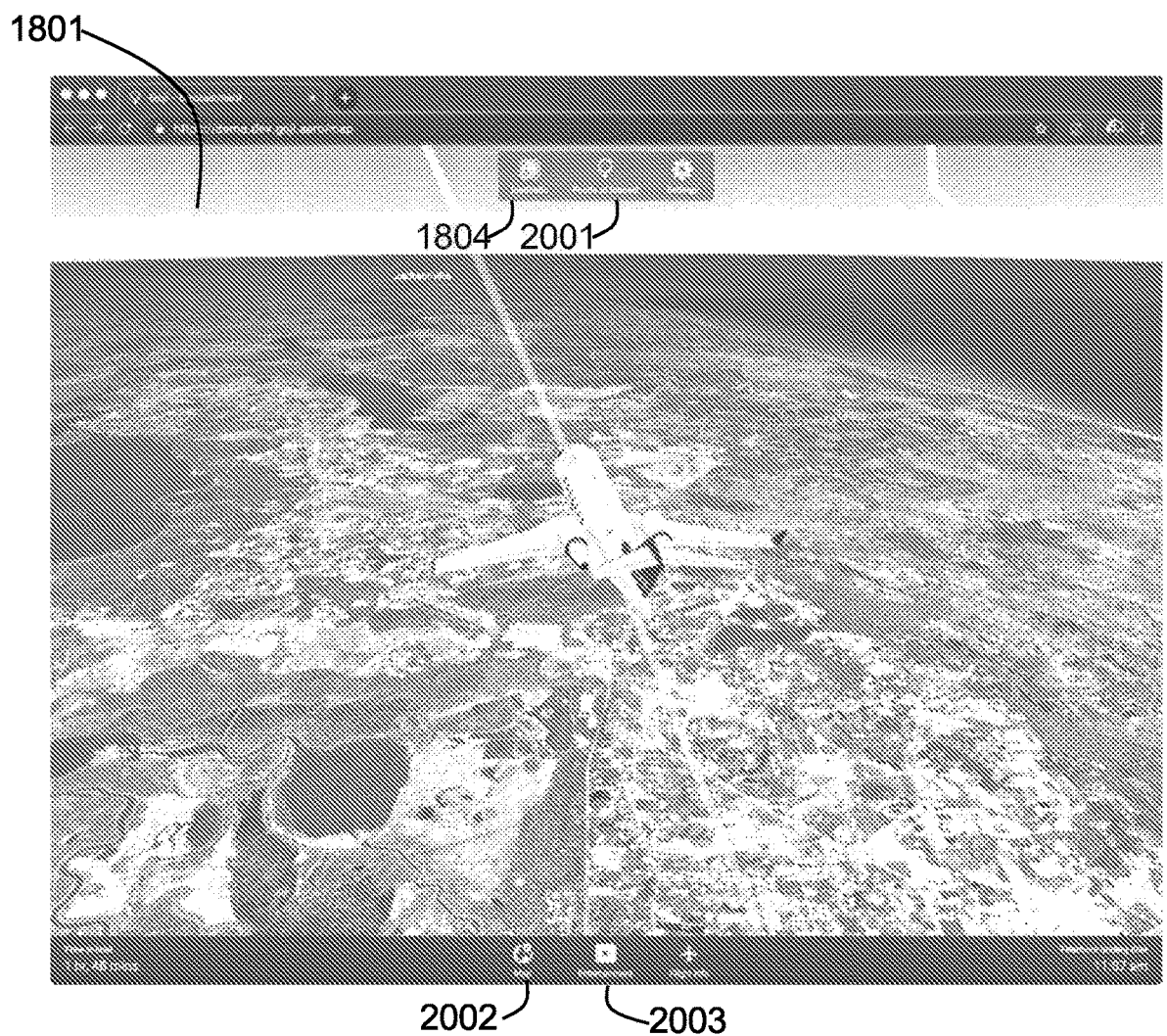
FIG. 20 shows another example interface for displaying multi-media concurrent with a location.

FIG. 20 shows an example interface for displaying location information and one or more options for displaying multi-media relevant to the location information. In some implementations, a default map [1801] of the current geo-relevant information can be the default interface. The map can include one or more interactive elements that can be used to initiate various assets. For example, the map can include a "Points of Interest" button [2001] that when pressed, can facilitate the display of one or more geo-relevant visual displays (e.g., a photo, a video, or a combination of the two). Geo-relevant visual displays can be related or unrelated to geo-relevant audio programming.

In some implementations, geo-relevant audio programming can be initiated using an interactive element associated with the map (e.g., the GeoRadio" button [1804]). In some implementations, the interface can return to the map (e.g., automatically or at a pre-determined interval), or when input data corresponding to an interaction with an interactive element is received (e.g., a "map" button [2002]).

In some implementations, the interface can display one or more additional entertainment options (e.g., audio, visual, textual, multimedia, etc.), when input data is received corresponding to an interaction with a button or link such as an "Entertainment" button [2003].

Figure 21:
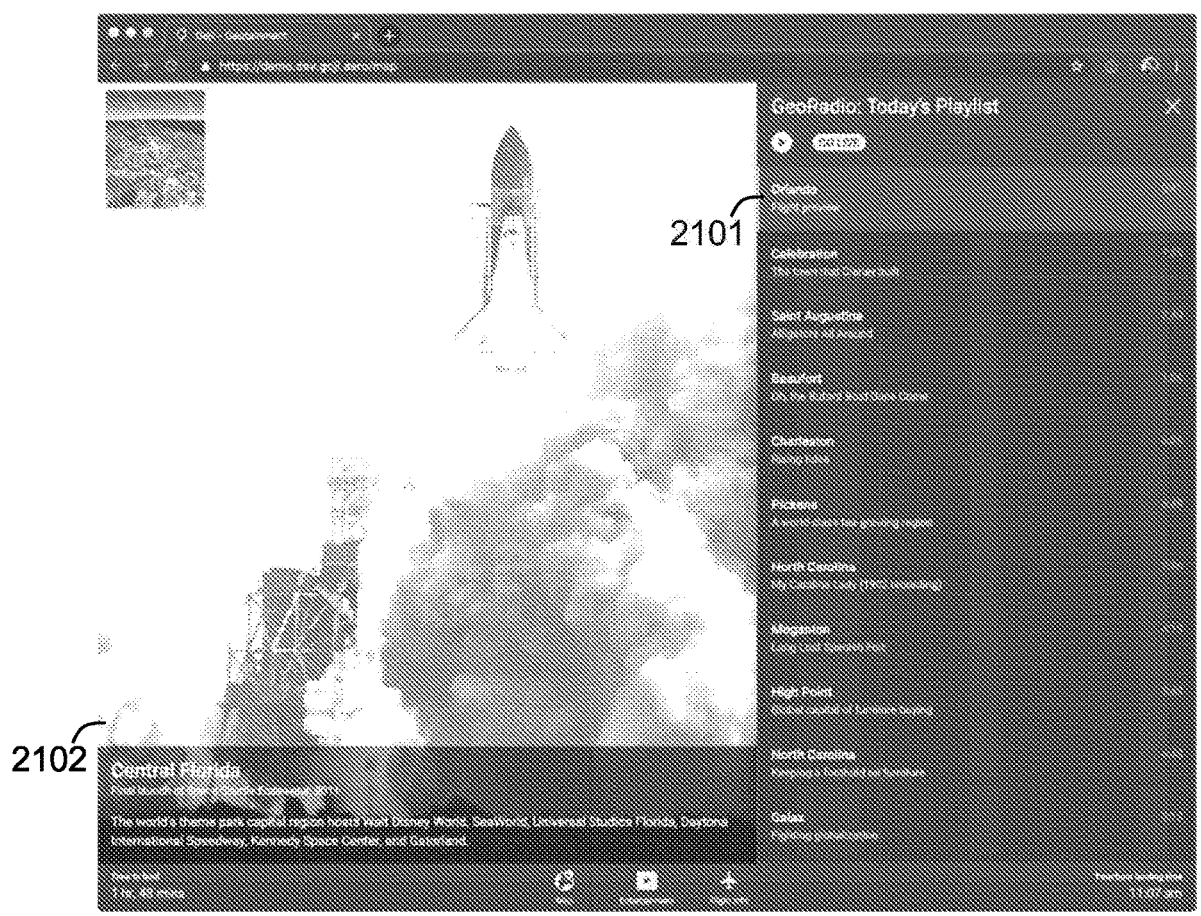
FIG. 21 shows another example interface for displaying multi-media concurrent with a location.

FIG. 21 shows another example interface for displaying multi-media concurrent with a location. In some implementations, audio assets (such as the playlist item called "Orlando" [2101]) and visual assets (such as the photograph of a Space Shuttle labeled "Central Florida" [2201]) can be displayed and executed simultaneously. In these implementations, the assets can be related to one another by the geo-relevant location information and can be played in accordance with a playlist (e.g., an optimized playlist of assets). In other implementations, the assets can be available to scroll through (e.g., randomly or by a user), and thus they can be viewed or heard (e.g., one time or many times) at any moment in time.

Figure 22:
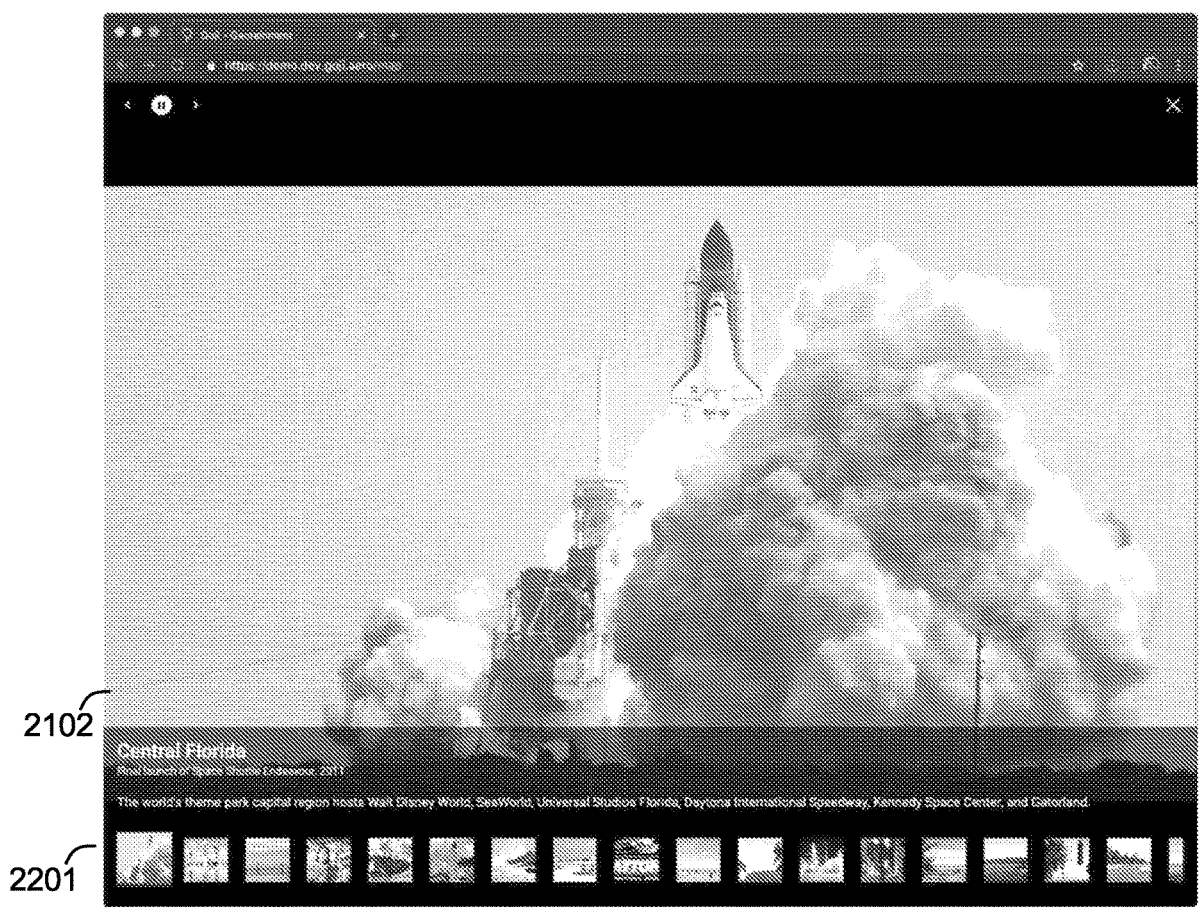
FIG. 22 shows an example interface for displaying photos relevant to location information.

FIG. 22 shows an example interface for displaying photos relevant to location information. In some implementations, visual assets [2102] can be displayed (e.g., "points-of-interest"), as they become geo-relevant. In some implementations, assets can include information corresponding to a current location [2102]. In other implementations, assets can include information relevant to a collection of one or many locations or destinations associated with a transportation vehicle. For example, because the assets can be interacted with in any order, a user could select a destination asset and see destination information corresponding to the destination asset. Additionally, the destination information can include one or more interactive links or buttons which could be used to plan events (e.g., buy tickets, pick seats, etc.), arrange transportation (e.g., rideshare, limousine, or hotel shuttle), accommodations (e.g., hotel, rental property, campsite, etc.), and/or reservations (e.g., restaurant, theater, etc.). Using the interactive link, a user could arrange for all needs such that they are available upon arrival. Additionally, the interface can include information from a source that offers reviews (e.g. of restaurants, hotels, events, etc.), for one or more locations. This information can be stored on the local server (e.g., server [1100]), or in instances where the server is connected to a cloud service [1401], can be accessed using the Internet.

Additionally, in some implementations, the server can use machine learning and artificial intelligence to suggest various items to a user. Suggestions can be made using data known about a user (e.g., travel data), or data known about similarly situated users. As input is received by a user or similarly situated users, the system can update the preferences and increase the likelihood that a user would like one or more items.

Figure 23:
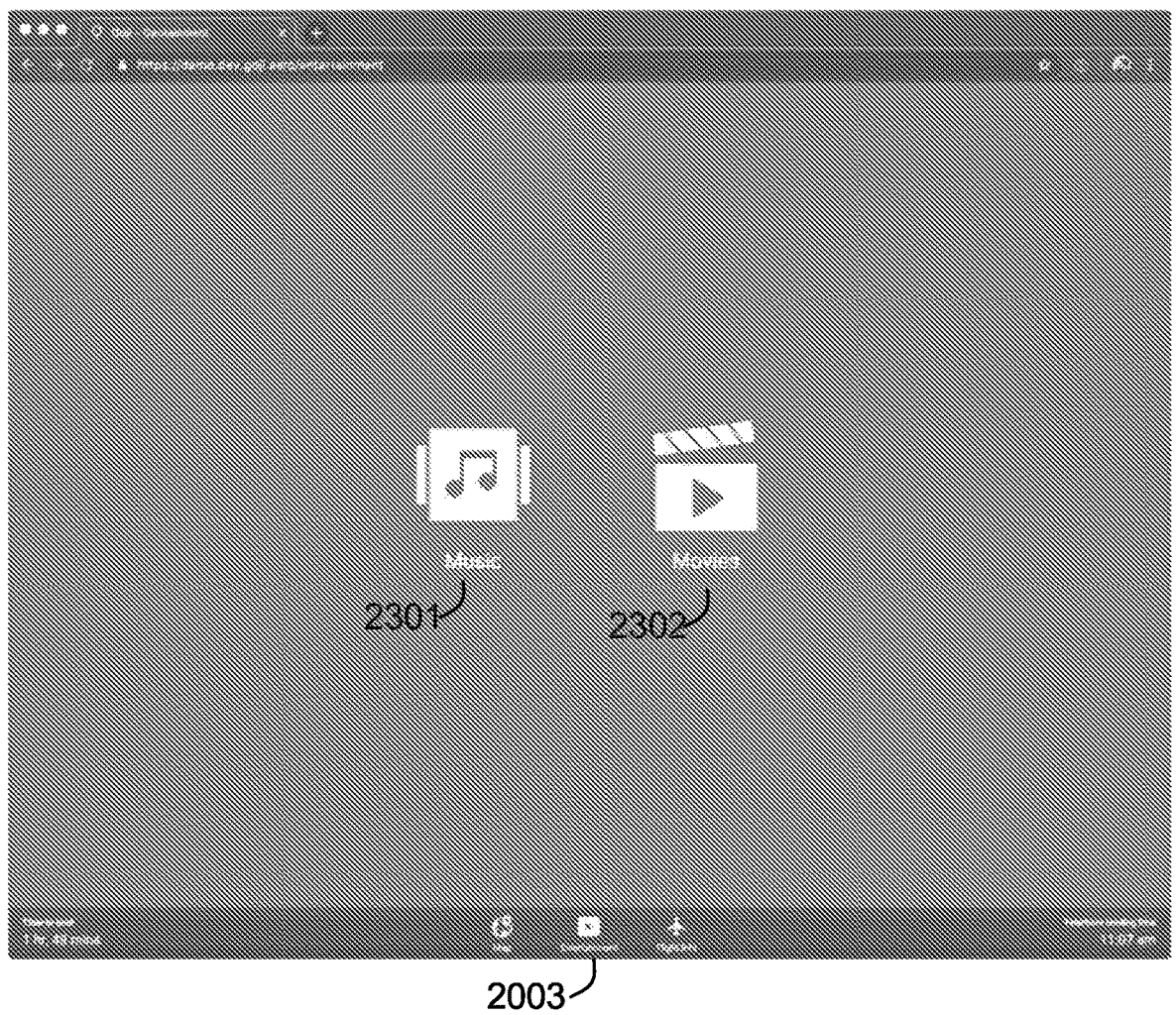
FIG. 23 shows an example interface for offering audio and video options.

FIG. 23 shows an example interface for offering audio and video options. In some implementations, as noted above in FIG. 20, one or more entertainment options (e.g., music [2301], movies [2302], magazines, books, etc.), can be made available to a user automatically, or upon receiving an indication corresponding to the selection of an interactive element (e.g., the "Entertainment" button [2003]). Receiving an additional indication corresponding to the selection of an Entertainment Option (e.g., selecting "Music" [2301] or selecting "Movies" [2302]) will cause the server to present additional information and options corresponding to available Entertainment Options. Entertainment Options can be geo-relevant or non-geo-relevant. For example, a user could randomly select to read any magazine option available, regardless of whether the option is currently geo-relevant. In another example, a user could select to have geo-relevant books read and displayed to a child.

In some implementations, the server can generate a geo-triggered digital magazine that can be dynamically assembled at the beginning of, and during, a journey. The content, which can consist of elements including written articles, illustrations, and links, can be dynamically assembled from a library of one or more articles that can be stored on the server and geo-tagged to correspond to one or more specific areas. The articles can be selected according to the predicted route of the user. During the journey, the digital magazine can offer interactivity for the user to choose either a self-guided experience, where the user can select and read articles throughout the magazine in any order, or a geo-curated experience, where the server highlights any articles that correspond to the current location of a transportation vehicle associated with a user. In some implementations, the digital magazine can be downloadable in a text format such as a pdf, and passengers can instruct the server to send the issue to their address using methods such as email, text, and mail.

Figure 24:
FIG. 24 shows an example interface for selecting an audio option.

FIG. 24 shows an example interface for selecting an audio option (e.g., "Music" [2301] as shown in FIG. 23). Selecting an option from the interface, for example, [2401], can cause the selected audio asset to display the contents associated with that audio asset.

Figure 25:
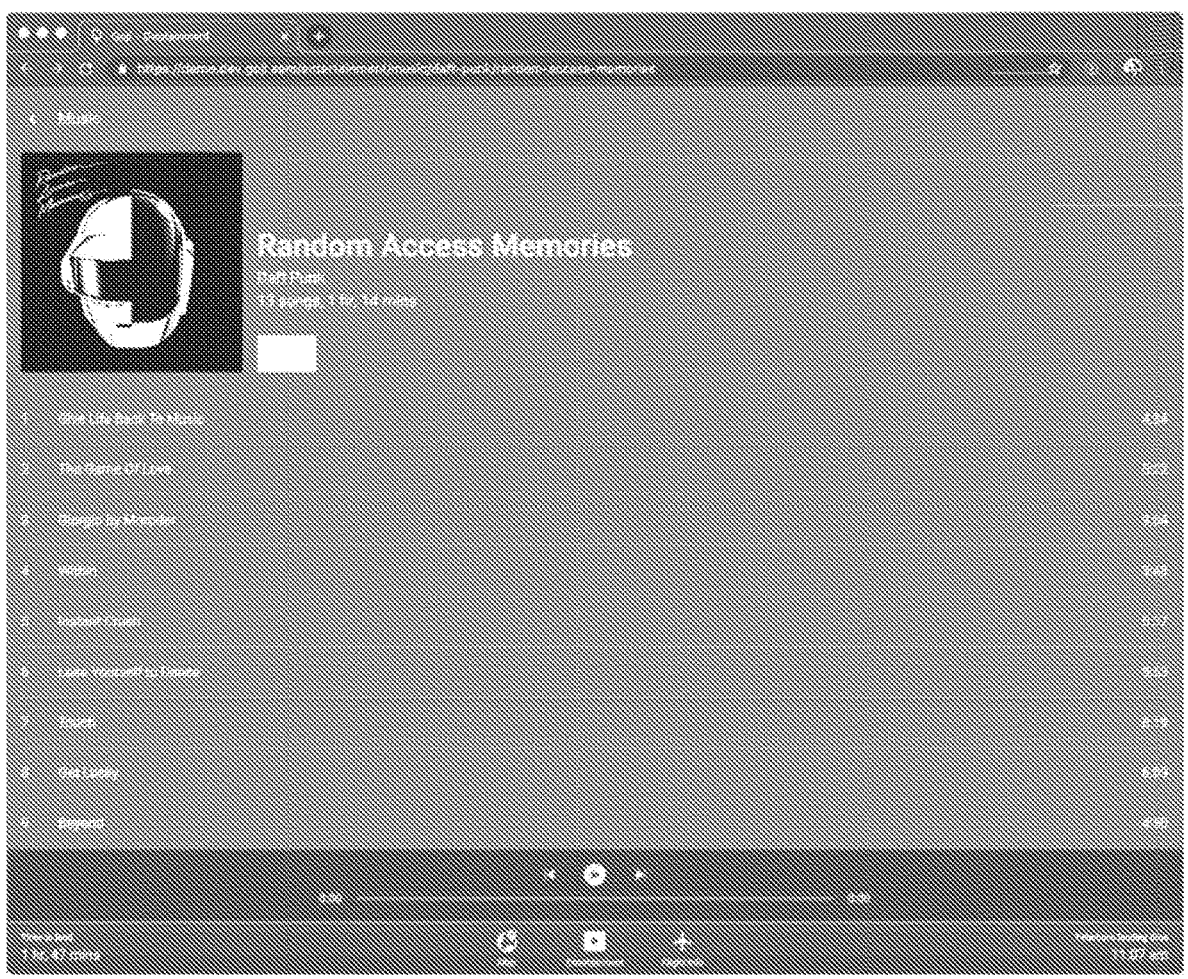
FIG. 25 shows another example interface for selecting an audio option.

FIG. 25 shows another example interface for selecting a specific audio option (a track from the Music asset "Random Access Memories". Selections can be played automatically and in any order or upon receiving interactive input data corresponding to a selection (e.g., of a particular track).

Figure 26:
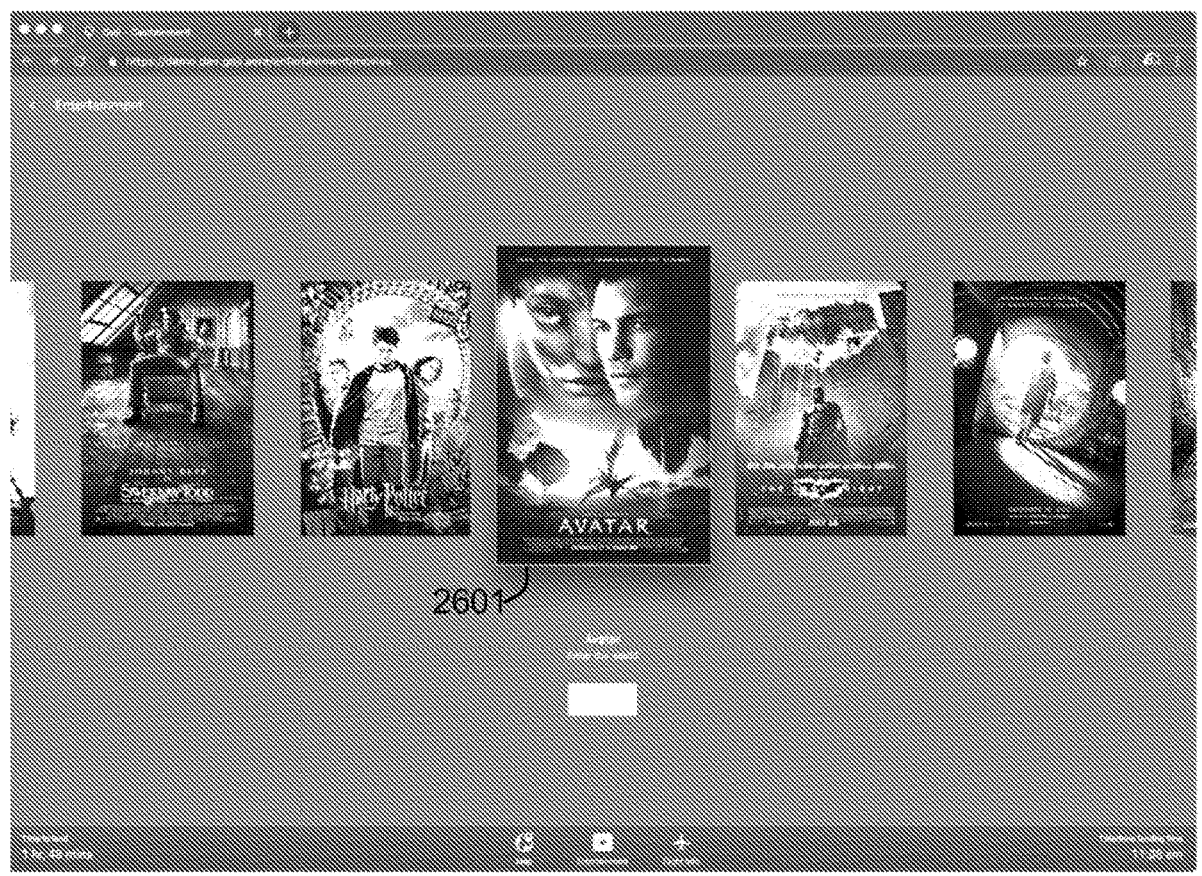
FIG. 26 shows an example interface for selecting a video option.

FIG. 26 shows an example interface for selecting a video option ("Movies" [2302] as shown in FIG. 23). Receiving input corresponding to a selection of an option from the interface, for example [2601], can cause the video asset to display the contents associated with that audio option.

Like reference numbers and designations in the various drawings indicate like elements.

The disclosed geo-location based entertainment system and methods can be performed using a computing server. An example computing server can include a processor (e.g., a central processing unit), memory, non-volatile memory, and an interface device. The memory may store data and/or and one or more code sets, software, scripts, etc. The components of the computer server can be coupled together via a bus or through some other known or convenient device. The processor may be configured to carry out all or part of methods described herein for example by executing code for example stored in memory. One or more of a user device or computer, a provider server or server, or a suspended database update server may include the components of the computing server or variations on such a server.

This disclosure contemplates the computer server taking any suitable physical form, including, but not limited to a Point-of-Sale server ("POS"). As example and not by way of limitation, the computer server may be an embedded computer server, a server-on-chip (SOC), a single-board computer server (SBC) (such as, for example, a computer-on-module (COM) or server-on-module (SOM)), a desktop computer server, a laptop or notebook computer server, an interactive kiosk, a mainframe, a mesh of computer servers, a mobile telephone, a personal digital assistant (PDA), a server, or a combination of two or more of these. Where appropriate, the computer server may include one or more computer servers; be unitary or distributed; span multiple locations; span multiple machines; and/or reside in a cloud, which may include one or more cloud components in one or more networks. Where appropriate, one or more computer servers may perform without substantial spatial or temporal limitation one or more steps of one or more methods described or illustrated herein. As an example and not by way of limitation, one or more computer servers may perform in real time or in batch mode one or more steps of one or more methods described or illustrated herein. One or more computer servers may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because servers can be created with all applicable data available in memory. A typical computer server will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer server. The interface can include an analog modem, Integrated Services Digital network (ISDNO modem, cable modem, token ring interface, satellite transmission interface (e.g., "direct PC"), or other interfaces for coupling a computer server to other computer servers. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer server can be controlled by operating server software that includes a file management server, such as a disk operating server. One example of operating server software with associated file management server software is the family of operating servers known as Windows® from Microsoft Corporation of Redmond, Wash., and their associated file management servers. Another example of operating server software with its associated file management server software is the Linux™ operating server and its associated file management server. The file management server can be stored in the non-volatile memory and/or drive unit and can cause the processor to execute the various acts required by the operating server to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer server, or similar electronic computing device, that manipulates and transforms data represented as physical (electronic) quantities within registers and memories of the computer server into other data similarly represented as physical quantities within the computer server memories or registers or other such information storage, transmission or display devices.

The algorithms and displays presented herein are not inherently related to any particular computer or other apparatus. Various general purpose servers may be used with programs in accordance with the teachings herein, or it may prove convenient to construct more specialized apparatus to perform the methods of some examples. The required structure for a variety of these servers will appear from the description below. In addition, the techniques are not described with reference to any particular programming language, and various examples may thus be implemented using a variety of programming languages.

In various implementations, the server operates as a standalone device or may be connected (e.g., networked) to other servers. In a networked deployment, the server may operate in the capacity of a server or a client server in a client-server network environment, or as a peer server in a peer-to-peer (or distributed) network environment.

The server may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any server capable of executing a set of instructions (sequential or otherwise) that specify actions to be taken by that server.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the server and that cause the server to perform any one or more of the methodologies or modules of disclosed herein.

In general, the routines executed to implement the implementations of the disclosure, may be implemented as part of an operating server or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer servers, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a server, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ servers having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other servers, not necessarily the server described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the servers, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the server may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer server bus. Furthermore, any computing servers referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of servers and components for a contextual connection server. It will be understood by one of ordinary skill in the art, however, that the implementations described above may be practiced without these specific details. For example, circuits, servers, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing servers that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback server, a printer, and/or other types of output devices. A data storage device, such as a hard drive or flash memory, can enable the computing device to temporarily or permanently store data. A network interface, such as a wireless or wired interface, can enable the computing device to communicate with a network.

Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall server. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update server.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Thus, particular embodiments of the invention have been described. Other embodiments are within the scope of the following claims. For example, the actions recited in the claims can be performed in a different order and still achieve desirable results.

What is claimed is:
1. A computer-implemented method, comprising:
determining a starting location;
determining a direction and speed of travel;
calculating future location information;
filtering one or more geo-relevant interactive assets using the future location information;
embedding the one or more geo-relevant interactive assets into a map, wherein the one or more geo-relevant interactive assets are listed in a playlist displayed as part of the map;
monitoring one or more interactions with the geo-relevant interactive assets;
processing the one or more monitored interactions using a machine-learning model to generate one or more predictive calculations for future interactions, wherein the one or more monitored interactions are processed as they are being received;

receiving current location information;

determining one or more new geo-relevant interactive assets that are associated with a predictive calculation and current location information;

dynamically updating the playlist displayed as part of the map, wherein the dynamically updated playlist includes the one or more new geo-relevant interactive assets; and displaying the updated playlist.

2. The method of claim 1, wherein geo-relevant interactive assets are individually selectable in any order on a playlist, regardless of relevancy.

3. The method of claim 1, wherein the displayed playlist includes an interactive element that returns execution of the playlist to the current location.

4. The method of claim 1, wherein a geo-relevant interactive asset can be an audio asset or a visual asset, and wherein two or more geo-relevant interactive assets can be simultaneously played or displayed.

5. The method of claim 1, further comprising:
determining destination information associated with one or more interactive destination elements.

6. The method of claim 1, wherein when an interactive asset is no longer geo-relevant, the interactive asset is removed and replaced with a different geo-relevant interactive asset.

7. A server, comprising:
a processor;
a non-transitory computer-readable storage medium containing instructions which when executed on the processor, cause the processor to perform operations including:
determining a starting location;
determining a direction and speed of travel;
calculating future location information;
filtering one or more geo-relevant interactive assets using the future location information;
embedding the one or more geo-relevant interactive assets into a map, wherein the one or more geo-relevant interactive assets are listed in a playlist displayed as part of the map;
monitoring one or more interactions with the geo-relevant interactive assets;
processing the one or more monitored interactions using a machine-learning model to generate one or more predictive calculations for future interactions, wherein the one or more monitored interactions are processed as they are being received;
receiving current location information;
determining one or more new geo-relevant interactive assets that are associated with a predictive calculation and current location information;
receiving current location information;
determining one or more new geo-relevant interactive assets that are associated with the current location information;
dynamically updating the playlist displayed as part of the map, wherein the dynamically updated playlist includes the one or more new geo-relevant interactive assets; and
displaying the updated playlist.

8. The server of claim 7, wherein geo-relevant interactive assets are individually selectable in any order on a playlist, regardless of relevancy.

9. The server of claim 7, wherein the displayed playlist includes an interactive element that returns execution of the playlist to the current location.

10. The server of claim 7, wherein a geo-relevant interactive asset can be an audio asset or a visual asset, and wherein two or more geo-relevant interactive assets can be simultaneously played or displayed.

11. The server of claim 7, further comprising:
determining destination information associated with one or more interactive destination elements.

12. The server of claim 7, wherein when an interactive asset is no longer geo-relevant, the interactive asset is removed and replaced with a different geo-relevant interactive asset.

13. A computer-program product tangibly embodied in a non-transitory machine-readable storage medium, including instructions configured to cause a data processing apparatus to:
determine a starting location;
determine a direction and speed of travel;
calculate future location information;
filter one or more geo-relevant interactive assets using the future location information;
embed the one or more geo-relevant interactive assets into a map, wherein the one or more geo-relevant interactive assets are listed in a playlist displayed as part of the map;
monitor one or more interactions with the geo-relevant interactive assets;
process the one or more monitored interactions using a machine-learning model to generate one or more predictive calculations for future interactions, wherein the one or more monitored interactions are processed as they are being received;
receiving current location information;
determining one or more new geo-relevant interactive assets that are associated with a predictive calculation and current location information;
receive current location information;
determine one or more new geo-relevant interactive assets that are associated with the current location information;
dynamically update the playlist displayed as part of the map, wherein the dynamically updated playlist includes the one or more new geo-relevant interactive assets; and
display the updated playlist.

14. The computer-program product of claim 13, wherein geo-relevant interactive assets are individually selectable in any order on a playlist, regardless of relevancy.

15. The computer-program product of claim 13, wherein the displayed playlist includes an interactive element that returns execution of the playlist to the current location.

16. The computer-program product of claim 13, wherein a geo-relevant interactive asset can be an audio asset or a visual asset, and wherein two or more geo-relevant interactive assets can be simultaneously played or displayed.

17. The computer-program product of claim 13, further comprising instructions configured to cause a data processing apparatus to: and
determine destination information associated with one or more interactive destination elements.

18. The computer-program product of claim 13, wherein when an interactive asset is no longer geo-relevant, the interactive asset is removed and replaced with a different geo-relevant interactive asset.

19. The method of claim 1, wherein a predictive calculation increases a likelihood of a future interaction.

20. The server of claim 7, wherein a predictive calculation increases a likelihood of a future interaction.

21. The computer-program product of claim 13, wherein a predictive calculation increases a likelihood of a future interaction.

\* \* \* \* \*